United States Patent
Laroia et al.

(10) Patent No.: US 8,199,634 B2
(45) Date of Patent: *Jun. 12, 2012

(54) SIGNALING METHOD IN AN OFDM MULTIPLE ACCESS SYSTEM

(75) Inventors: Rajiv Laroia, Far Hills, NJ (US); Junyi Li, Bedminster, NJ (US); Sathya Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,196

(22) Filed: Jun. 10, 2011

(65) Prior Publication Data

US 2011/0235745 A1    Sep. 29, 2011

Related U.S. Application Data

(63) Continuation of application No. 12/171,155, filed on Jul. 10, 2008, now Pat. No. 8,014,271, and a continuation of application No. 09/805,887, filed on Mar. 15, 2001, now Pat. No. 7,295,509.

(60) Provisional application No. 60/230,937, filed on Sep. 13, 2000.

(51) Int. Cl.
  H04J 11/00    (2006.01)
  H04B 7/216    (2006.01)

(52) U.S. Cl. .......................... 370/208; 370/335; 370/342

(58) Field of Classification Search .................. None
See application file for complete search history.

(56) References Cited

U.S. PATENT DOCUMENTS

| | | |
|---|---|---|
| 4,393,276 A | 7/1983 | Steele |
| 4,554,668 A | 11/1985 | Deman et al. |
| 4,747,137 A | 5/1988 | Matsunaga |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |

(Continued)

FOREIGN PATENT DOCUMENTS

CA    2348137    11/2001

(Continued)

OTHER PUBLICATIONS

"Introduction to cdma2000 Standards for Spread Spectrum Systems",TIA/EIA/IS-2000 Standards for CDMA2000 Spread Spectrum Systems 3GPP2 C.S0001-0 Version 1.0, Jul. 1999, 16 pages.

(Continued)

Primary Examiner — Steven H Nguyen
(74) Attorney, Agent, or Firm — Kenneth Vu

(57) ABSTRACT

A method for reducing the peak-to-average ratio in an OFDM communication signal is provided. The method includes defining a constellation having a plurality of symbols, defining a symbol duration for the OFDM communication signal, and defining a plurality of time instants in the symbol duration. A plurality of tones are allocated to a particular communication device, and a discrete signal is constructed in the time domain by mapping symbols from the constellation to the time instants. A continuous signal is generated by applying an interpolation function to the discrete signal such that the continuous signal only includes sinusoids having frequencies which are equal to the allocated tones.

36 Claims, 12 Drawing Sheets

U.S. PATENT DOCUMENTS

| | | | |
|---|---|---|---|
| 5,371,761 A | 12/1994 | Daffara et al. | |
| 5,384,810 A | 1/1995 | Amrany | |
| 5,406,551 A | 4/1995 | Saito et al. | |
| 5,410,538 A | 4/1995 | Roche et al. | |
| 5,455,839 A | 10/1995 | Eyuboglu | |
| 5,491,727 A | 2/1996 | Petit | |
| 5,513,379 A | 4/1996 | Benveniste et al. | |
| 5,539,748 A | 7/1996 | Raith | |
| 5,548,582 A | 8/1996 | Brajal et al. | |
| 5,583,869 A | 12/1996 | Grube et al. | |
| 5,594,738 A | 1/1997 | Crisler et al. | |
| 5,604,744 A | 2/1997 | Andersson et al. | |
| 5,612,978 A | 3/1997 | Blanchard et al. | |
| 5,625,876 A | 4/1997 | Gilhousen et al. | |
| 5,726,978 A | 3/1998 | Frodigh et al. | |
| 5,732,113 A | 3/1998 | Schmidl et al. | |
| 5,745,487 A | 4/1998 | Hamaki | |
| 5,768,276 A | 6/1998 | Diachina et al. | |
| 5,790,537 A | 8/1998 | Yoon et al. | |
| 5,812,938 A | 9/1998 | Gilhousen et al. | |
| 5,815,488 A | 9/1998 | Williams et al. | |
| 5,822,368 A | 10/1998 | Wang | |
| 5,838,268 A | 11/1998 | Frenkel | |
| 5,867,478 A | 2/1999 | Baum et al. | |
| 5,870,393 A | 2/1999 | Yano et al. | |
| 5,887,023 A | 3/1999 | Mabuchi | |
| 5,907,585 A * | 5/1999 | Suzuki et al. | 375/324 |
| 5,920,571 A | 7/1999 | Houck et al. | |
| 5,926,470 A | 7/1999 | Tiedemann, Jr. | |
| 5,933,421 A | 8/1999 | Alamouti et al. | |
| 5,949,814 A | 9/1999 | Odenwalder et al. | |
| 5,953,325 A | 9/1999 | Willars | |
| 5,955,992 A | 9/1999 | Shattil | |
| 5,956,642 A | 9/1999 | Larsson et al. | |
| 5,995,992 A | 11/1999 | Eckard | |
| 5,999,826 A | 12/1999 | Whinnett | |
| 6,002,942 A | 12/1999 | Park | |
| 6,016,123 A | 1/2000 | Barton et al. | |
| 6,038,263 A | 3/2000 | Kotzin et al. | |
| 6,038,450 A | 3/2000 | Brink et al. | |
| 6,061,337 A | 5/2000 | Light et al. | |
| 6,067,315 A | 5/2000 | Sandin | |
| 6,075,350 A | 6/2000 | Peng | |
| 6,075,797 A | 6/2000 | Thomas | |
| 6,076,114 A | 6/2000 | Wesley | |
| 6,088,345 A | 7/2000 | Sakoda et al. | |
| 6,108,323 A | 8/2000 | Gray | |
| 6,108,550 A | 8/2000 | Wiorek et al. | |
| 6,112,094 A | 8/2000 | Dent | |
| 6,128,776 A | 10/2000 | Kang | |
| 6,138,037 A | 10/2000 | Jaamies | |
| 6,141,317 A | 10/2000 | Marchok et al. | |
| 6,154,484 A | 11/2000 | Lee et al. | |
| 6,175,550 B1 | 1/2001 | Van Nee | |
| 6,175,650 B1 | 1/2001 | Sindhu et al. | |
| 6,198,775 B1 | 3/2001 | Khayrallah et al. | |
| 6,215,983 B1 | 4/2001 | Dogan et al. | |
| 6,226,280 B1 | 5/2001 | Roark et al. | |
| 6,232,918 B1 | 5/2001 | Wax et al. | |
| 6,240,129 B1 | 5/2001 | Reusens et al. | |
| 6,249,683 B1 | 6/2001 | Lundby et al. | |
| 6,256,478 B1 | 7/2001 | Allen et al. | |
| 6,271,946 B1 | 8/2001 | Chang et al. | |
| 6,272,122 B1 | 8/2001 | Wee | |
| 6,310,704 B1 | 10/2001 | Dogan et al. | |
| 6,317,435 B1 | 11/2001 | Tiedemann, Jr. et al. | |
| 6,335,922 B1 | 1/2002 | Tiedemann, Jr. et al. | |
| 6,337,659 B1 | 1/2002 | Kim | |
| 6,337,983 B1 | 1/2002 | Bonta et al. | |
| 6,353,637 B1 | 3/2002 | Mansour et al. | |
| 6,363,060 B1 | 3/2002 | Sarkar | |
| 6,374,115 B1 | 4/2002 | Barnes et al. | |
| 6,377,539 B1 | 4/2002 | Kang et al. | |
| 6,377,809 B1 | 4/2002 | Rezaiifar et al. | |
| 6,388,998 B1 | 5/2002 | Kasturia | |
| 6,393,008 B1 | 5/2002 | Cheng et al. | |
| 6,393,012 B1 | 5/2002 | Pankaj | |
| 6,401,062 B1 | 6/2002 | Murashima | |
| 6,438,369 B1 | 8/2002 | Huang et al. | |
| 6,449,246 B1 | 9/2002 | Barton et al. | |
| 6,466,800 B1 | 10/2002 | Sydon et al. | |
| 6,473,467 B1 | 10/2002 | Wallace et al. | |
| 6,477,317 B1 | 11/2002 | Itokawa | |
| 6,478,422 B1 | 11/2002 | Hansen | |
| 6,483,820 B1 | 11/2002 | Davidson et al. | |
| 6,496,790 B1 | 12/2002 | Kathavate et al. | |
| 6,501,810 B1 | 12/2002 | Karim et al. | |
| 6,507,601 B2 | 1/2003 | Parsa et al. | |
| 6,519,462 B1 | 2/2003 | Lu et al. | |
| 6,529,525 B1 | 3/2003 | Pecen et al. | |
| 6,535,666 B1 | 3/2003 | Dogan et al. | |
| 6,539,008 B1 | 3/2003 | Ahn et al. | |
| 6,539,213 B1 | 3/2003 | Richards et al. | |
| 6,542,485 B1 | 4/2003 | Mujtaba | |
| 6,542,743 B1 | 4/2003 | Soliman | |
| 6,563,806 B1 | 5/2003 | Yano et al. | |
| 6,563,881 B1 | 5/2003 | Sakoda et al. | |
| 6,577,739 B1 | 6/2003 | Hurtig et al. | |
| 6,584,140 B1 | 6/2003 | Lee | |
| 6,590,881 B1 | 7/2003 | Wallace et al. | |
| 6,597,746 B1 | 7/2003 | Amrany et al. | |
| 6,614,857 B1 | 9/2003 | Buehrer et al. | |
| 6,625,172 B2 | 9/2003 | Odenwalder et al. | |
| 6,636,568 B2 | 10/2003 | Kadous | |
| 6,654,431 B1 | 11/2003 | Barton et al. | |
| 6,657,949 B1 | 12/2003 | Jones, IV et al. | |
| 6,658,258 B1 | 12/2003 | Chen et al. | |
| 6,674,787 B1 | 1/2004 | Dick et al. | |
| 6,674,810 B1 | 1/2004 | Cheng | |
| 6,675,012 B2 | 1/2004 | Gray | |
| 6,678,318 B1 | 1/2004 | Lai | |
| 6,690,951 B1 | 2/2004 | Cuffaro et al. | |
| 6,693,952 B1 | 2/2004 | Chuah et al. | |
| 6,701,165 B1 | 3/2004 | Ho et al. | |
| 6,704,571 B1 | 3/2004 | Moon | |
| 6,711,400 B1 | 3/2004 | Aura | |
| 6,717,908 B2 | 4/2004 | Vijayan et al. | |
| 6,721,568 B1 | 4/2004 | Gustavsson et al. | |
| 6,724,719 B1 | 4/2004 | Tong et al. | |
| 6,731,602 B1 | 5/2004 | Watanabe et al. | |
| 6,744,743 B2 | 6/2004 | Walton et al. | |
| 6,748,220 B1 | 6/2004 | Chow et al. | |
| 6,751,444 B1 | 6/2004 | Meiyappan | |
| 6,751,456 B2 | 6/2004 | Bilgic | |
| 6,754,511 B1 | 6/2004 | Halford et al. | |
| 6,763,009 B1 | 7/2004 | Bedekar et al. | |
| 6,765,969 B1 | 7/2004 | Vook et al. | |
| 6,778,513 B2 | 8/2004 | Kasapi et al. | |
| 6,799,043 B2 | 9/2004 | Tiedemann, Jr. et al. | |
| 6,802,035 B2 | 10/2004 | Catreux et al. | |
| 6,813,284 B2 | 11/2004 | Vayanos et al. | |
| 6,829,293 B2 | 12/2004 | Jones et al. | |
| 6,831,943 B1 | 12/2004 | Dabak et al. | |
| 6,842,487 B1 | 1/2005 | Larsson | |
| 6,850,481 B2 | 2/2005 | Wu et al. | |
| 6,870,808 B1 | 3/2005 | Liu et al. | |
| 6,870,826 B1 | 3/2005 | Ishizu | |
| 6,907,020 B2 | 6/2005 | Periyalwar et al. | |
| 6,907,269 B2 | 6/2005 | Yamaguchi et al. | |
| 6,909,707 B2 | 6/2005 | Rotstein et al. | |
| 6,928,047 B1 | 8/2005 | Xia | |
| 6,934,266 B2 | 8/2005 | Dulin et al. | |
| 6,934,275 B1 | 8/2005 | Love et al. | |
| 6,940,842 B2 | 9/2005 | Proctor, Jr. | |
| 6,940,845 B2 | 9/2005 | Benveniste | |
| 6,954,448 B2 | 10/2005 | Farley et al. | |
| 6,954,481 B1 | 10/2005 | Laroia et al. | |
| 6,961,364 B1 | 11/2005 | Laroia et al. | |
| 6,963,543 B2 | 11/2005 | Diep et al. | |
| 6,975,868 B2 | 12/2005 | Joshi et al. | |
| 6,980,540 B1 | 12/2005 | Laroia et al. | |
| 6,985,434 B2 | 1/2006 | Wu et al. | |
| 6,985,453 B2 | 1/2006 | Lundby et al. | |
| 6,985,466 B1 | 1/2006 | Yun et al. | |
| 7,006,529 B2 | 2/2006 | Alastalo et al. | |
| 7,010,048 B1 * | 3/2006 | Shattil | 375/259 |
| 7,016,318 B2 | 3/2006 | Pankaj et al. | |

| | | |
|---|---|---|
| 7,016,425 B1 | 3/2006 | Kraiem |
| 7,050,402 B2 | 5/2006 | Schmidl et al. |
| 7,061,898 B2 | 6/2006 | Hashem et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,099,630 B2 | 8/2006 | Brunner et al. |
| 7,120,134 B2 | 10/2006 | Tiedemann, Jr. et al. |
| 7,133,460 B2 | 11/2006 | Bae et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,161,971 B2 | 1/2007 | Tiedemann, Jr. et al. |
| 7,164,696 B2 | 1/2007 | Sano et al. |
| 7,200,177 B2 | 4/2007 | Miyoshi |
| 7,215,979 B2 | 5/2007 | Nakagawa et al. |
| 7,248,559 B2 | 7/2007 | Ma et al. |
| 7,248,841 B2 | 7/2007 | Agee et al. |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,292,651 B2 | 11/2007 | Li |
| 7,295,509 B2 * | 11/2007 | Laroia et al. ............... 370/208 |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,349,371 B2 | 3/2008 | Schein et al. |
| 7,363,055 B2 | 4/2008 | Castrogiovanni et al. |
| 7,379,489 B2 | 5/2008 | Zuniga et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,418,043 B2 | 8/2008 | Shattil |
| 7,447,270 B1 | 11/2008 | Hottinen |
| 7,471,963 B2 | 12/2008 | Kim et al. |
| 7,623,442 B2 * | 11/2009 | Laroia et al. ............... 370/208 |
| 7,916,624 B2 * | 3/2011 | Laroia et al. ............... 370/208 |
| 7,924,699 B2 * | 4/2011 | Laroia et al. ............... 370/208 |
| 7,990,843 B2 * | 8/2011 | Laroia et al. ............... 370/208 |
| 7,990,844 B2 * | 8/2011 | Laroia et al. ............... 370/208 |
| 8,014,271 B2 * | 9/2011 | Laroia et al. ............... 370/208 |
| 2001/0024427 A1 | 9/2001 | Suzuki |
| 2001/0030948 A1 | 10/2001 | Tiedemann |
| 2001/0055294 A1 | 12/2001 | Motoyoshi |
| 2002/0018157 A1 | 2/2002 | Zhang et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0159422 A1 | 10/2002 | Li et al. |
| 2002/0168946 A1 | 11/2002 | Aizawa et al. |
| 2002/0176398 A1 | 11/2002 | Nidda |
| 2003/0043732 A1 | 3/2003 | Walton et al. |
| 2003/0185310 A1 | 10/2003 | Ketchum et al. |
| 2004/0015692 A1 | 1/2004 | Green et al. |
| 2004/0077379 A1 | 4/2004 | Smith et al. |
| 2004/0097215 A1 | 5/2004 | Abe et al. |
| 2004/0136344 A1 | 7/2004 | Kim et al. |
| 2004/0166867 A1 | 8/2004 | Hawe |
| 2004/0252629 A1 | 12/2004 | Hasegawa et al. |
| 2004/0257979 A1 | 12/2004 | Ro et al. |
| 2005/0002440 A1 | 1/2005 | Alamouti et al. |
| 2005/0030886 A1 | 2/2005 | Wu et al. |
| 2005/0034079 A1 | 2/2005 | Gunasekar et al. |
| 2005/0044206 A1 | 2/2005 | Johansson et al. |
| 2005/0053081 A1 | 3/2005 | Andersson et al. |
| 2005/0073976 A1 | 4/2005 | Fujii |
| 2005/0147024 A1 | 7/2005 | Jung et al. |
| 2005/0159162 A1 | 7/2005 | Park |
| 2005/0174981 A1 | 8/2005 | Heath, Jr. et al. |
| 2005/0204247 A1 | 9/2005 | Guo et al. |
| 2005/0243791 A1 | 11/2005 | Park et al. |
| 2005/0276348 A1 * | 12/2005 | Vandenameele ............... 375/299 |
| 2006/0002451 A1 | 1/2006 | Fukuta et al. |
| 2006/0083159 A1 | 4/2006 | Laroia et al. |
| 2006/0172704 A1 | 8/2006 | Nishio et al. |
| 2007/0064669 A1 | 3/2007 | Classon et al. |
| 2007/0177631 A1 | 8/2007 | Popovic et al. |
| 2007/0242653 A1 | 10/2007 | Yang et al. |
| 2008/0063099 A1 | 3/2008 | Laroia et al. |
| 2008/0181139 A1 | 7/2008 | Rangarajan et al. |
| 2009/0022098 A1 | 1/2009 | Novak et al. |
| 2009/0197646 A1 | 8/2009 | Tamura et al. |
| 2009/0285163 A1 | 11/2009 | Zhang et al. |
| 2010/0254263 A1 | 10/2010 | Chen et al. |
| 2011/0255518 A9 | 10/2011 | Agrawal et al. |

FOREIGN PATENT DOCUMENTS

| | | |
|---|---|---|
| CA | 2477536 | 9/2003 |
| CL | 19931400 | 12/1994 |
| CL | 8461997 | 1/1998 |
| CL | 009531997 | 1/1998 |
| CL | 46151 | 12/2009 |
| CN | 1252919 | 5/2000 |
| CN | 1267437 A | 9/2000 |
| CN | 1284795 | 2/2001 |
| CN | 1346221 | 4/2002 |
| CN | 1402916 A | 3/2003 |
| DE | 19800953 C1 | 7/1999 |
| DE | 19957288 C1 | 5/2001 |
| DE | 10240138 | 8/2003 |
| EP | 0488976 | 6/1992 |
| EP | 0568291 A2 | 11/1993 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1180907 A2 | 2/2002 |
| EP | 1187506 A1 | 3/2002 |
| EP | 1204217 A1 | 5/2002 |
| EP | 1392073 A1 | 2/2004 |
| EP | 1445873 A2 | 8/2004 |
| EP | 1465449 A1 | 10/2004 |
| EP | 1542488 A1 | 6/2005 |
| EP | 1601149 A2 | 11/2005 |
| EP | 1643669 A1 | 4/2006 |
| EP | 1538863 A1 | 6/2006 |
| GB | 2279540 A | 1/1995 |
| GB | 2348776 A | 10/2000 |
| JP | 08288927 | 11/1996 |
| JP | 9182148 A | 7/1997 |
| JP | 09214404 | 8/1997 |
| JP | 11191756 A | 7/1999 |
| JP | 11508417 T | 7/1999 |
| JP | 11298954 | 10/1999 |
| JP | 2000184425 | 6/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001521698 | 11/2001 |
| JP | 2002515203 T | 5/2002 |
| JP | 2003500909 | 1/2003 |
| JP | 2003348047 | 12/2003 |
| JP | 2004007643 A | 1/2004 |
| JP | 2004529524 T | 9/2004 |
| JP | 2004297756 | 10/2004 |
| JP | 2004534456 | 11/2004 |
| JP | 2005020530 | 1/2005 |
| KR | 20000060428 | 10/2000 |
| KR | 100291476 B1 | 3/2001 |
| KR | 20010056333 | 4/2001 |
| KR | 20030007965 | 1/2003 |
| RU | 95121152 | 12/1997 |

| | | |
|---|---|---|
| RU | 2141168 | 11/1999 |
| RU | 2141706 C1 | 11/1999 |
| RU | 2159007 C2 | 11/2000 |
| RU | 2162275 C2 | 1/2001 |
| RU | 2192094 | 10/2002 |
| RU | 2208913 | 7/2003 |
| RU | 2210866 C2 | 8/2003 |
| RU | 2216105 C2 | 11/2003 |
| RU | 2225080 C2 | 2/2004 |
| RU | 2235432 C2 | 8/2004 |
| RU | 2003125268 | 2/2005 |
| RU | 2250564 | 4/2005 |
| RU | 2257008 | 7/2005 |
| RU | 2285351 C2 | 10/2006 |
| RU | 2292655 | 1/2007 |
| SU | 1320883 | 6/1987 |
| TW | 508960 | 11/2002 |
| WO | WO9408432 | 4/1994 |
| WO | WO9521494 | 8/1995 |
| WO | WO9613920 A1 | 5/1996 |
| WO | WO9701256 | 1/1997 |
| WO | WO9737456 A2 | 10/1997 |
| WO | WO9746033 A2 | 12/1997 |
| WO | WO9800946 | 1/1998 |
| WO | WO9814026 | 4/1998 |
| WO | WO9837706 A2 | 8/1998 |
| WO | WO9848581 A1 | 10/1998 |
| WO | WO9853561 | 11/1998 |
| WO | WO98054919 | 12/1998 |
| WO | WO9941871 A1 | 8/1999 |
| WO | WO9944313 | 9/1999 |
| WO | WO9944383 A1 | 9/1999 |
| WO | WO9952250 A1 | 10/1999 |
| WO | WO9959265 | 11/1999 |
| WO | WO9960729 A1 | 11/1999 |
| WO | WO0002397 | 1/2000 |
| WO | WO0033503 | 6/2000 |
| WO | WO0070897 | 11/2000 |
| WO | WO01001596 | 1/2001 |
| WO | WO0117125 A1 | 3/2001 |
| WO | WO0139523 A2 | 5/2001 |
| WO | WO0145300 | 6/2001 |
| WO | WO0148969 A2 | 7/2001 |
| WO | WO0158054 A1 | 8/2001 |
| WO | WO0160106 | 8/2001 |
| WO | WO0169814 A1 | 9/2001 |
| WO | WO0182543 | 11/2001 |
| WO | WO0182544 A2 | 11/2001 |
| WO | WO0193505 | 12/2001 |
| WO | WO0204936 A1 | 1/2002 |
| WO | WO0215616 | 2/2002 |
| WO | WO0219746 A1 | 3/2002 |
| WO | WO0231991 | 4/2002 |
| WO | WO0233848 A2 | 4/2002 |
| WO | WO0245456 A1 | 6/2002 |
| WO | WO02060138 | 8/2002 |
| WO | WO0385876 | 10/2003 |
| WO | WO2004023834 A1 | 3/2004 |
| WO | WO2004032443 A1 | 4/2004 |
| WO | WO2004038972 A1 | 5/2004 |
| WO | WO2004051872 A2 | 6/2004 |
| WO | WO2004068721 A2 | 8/2004 |
| WO | WO2004073276 | 8/2004 |
| WO | WO2004077850 A2 | 9/2004 |
| WO | WO2005015797 | 2/2005 |
| WO | WO2005015810 | 2/2005 |
| WO | WO2005025110 A2 | 3/2005 |
| WO | WO2006099545 A1 | 9/2006 |
| WO | WO2006099577 A1 | 9/2006 |
| WO | WO2006127544 A2 | 11/2006 |
| WO | WO2007024935 | 3/2007 |

OTHER PUBLICATIONS

3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.

3rd Generation Partnership Project; Technical Specification Group Radio Access Network; Physical Layer Aspects for Evolved UTRA (Release 7), 3GPP TR 25814 v031 (Nov. 2005), pp. 1-57.

Bahai, Saltzberg: "System Architecture," Multi-Carrier Digital Communications, Kluwer Academic, New York, NY, XP-002199501, 1999, pp. 17-21.

Bingham: "Other Types of MCM," ADSL, VDSL, and Multicarrier Modulation, John Wiley & Sons, New York, XP-002199502. 2000, pp. 111-113.

Catreux, S. et al., "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/ie15/7153/19260/00891306.pdf"tp=&isnumber=19260&arnumber=8913063&punumber=7153.

Chennakeshu, et al. "Capacity Analysis of a TDMA-Based Slow-Frequency -Hopped Cellular System," IEEE Transaction on Vehicular Technology, vol. 45., No. 3, Aug. 1, 1996, pp. 531-542, XP000612951.

Choi, et al., "Design of the Optimum Pilot Pattern for Channel Estimation in OFDM Systems," Global Telecommunications Conference, IEEE Communications Society, Globecom, Dallas, Texas (2004), p. 3661-3665.

Czylwik: "Comparison Between Adaptive OFDM and Single Carrier Modulation with Frequency Domain Equalization," IEEE 47th Vehicular Technology Conference, vol. 2, May 4-7, 1997, pp. 865-869.

Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.

Das et al., "On the Reverse Link Interference Structure for Next Generation Cellular Systems," Global Telecommunications Conference, 2004. GLOBECOM '04, IEEE, vol. 5 IEEE Nov. 29-Dec. 3, 2004, pp. 3068-3072.

Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.

Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.

Dinis, R. et al.: "A Multiple Access Scheme for the Uplink of Broadband Wireless Systems," Global Telecommunications Conference, 2004. GLOBECOM "04. IEEE Dallas, TX, USA Nov. 29-Dec. 3, 2004, Vol. 6, p. 3808-3812, XP010758449 Piscataway , NJ, USA, IEEE.

Don Torrieri, "Cellular Frequency-Hopping CDMA Systems," IEEE Vehicular Technology Conference, May 16, 1999 , pp. 919-925, vol. 2.

Favre et al: "Self-Adaptive Transmission Procedure" IBM Technical Disclosure Bulletin, IBM Corporation, Sep. 1976, vol. 19, No. 4, pp. 1283-1284, New York, New York.

Guo, K. Et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.

Hermann Rohling et al.,: "Performance Comparison Of Different Multiple Access Schemes For the Downlink of an OFDM Communication System", Vehicular Technology Conference, 1997, 47th IEEE, vol. 3, May 3-7, 1997, pp. 1365-1369.

Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.

International Search Report—PCT/US2001/028314 , International Search Authority—European Patent Office, Jun. 5, 2002.

J.S. Chow and J.M. Cioffi: "A cost-effective maximum likelihood reciever for multicarrier systems", Proc. IEEE Int. Conf. On Comm., pp. 948-952, Jun. 1992.

Kaleh: "Channel Equalization for Block Transmission Systems," IEEE Journal on Selected Areas in Communications, vol. 13, No. 1, Jan. 1995, pp. 110-121.

Kappes, J.M., and Sayegh, S.I., "Programmable Demultiplexer/Demodulator Processor," COMSAT Laboratories, IEEE, Mar. 11, 1990, pp. 230-234.

Karsten Bruninghaus et al.,: "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.

Keller, et al.: "Adaptive Multicarrier Modulation: A Convenient Framework for Time-Frequency Processing in Wireless Communications," Proceedings of the IEEE, vol. 88, No. 5, May 2000, pp. 611-640.

Kim, et al. "Performance of TDMA System With SFH and 2-Bit Differentially Detected GMSK Over Rayleigh Fading Channel," IEEE Vehicular Technology Conference, April 28, 1996, pp. 789-794.

Kishiyama et al., Investigation of optimum pilot channel structure for VSF-OFCDM broadband wireless access in forward link, VTC 2003-Spring, The 57th IEEE Semiannual Vehicular Technology Conference, Proceedings JEJU, Korea, Apr. 22-25, 2003, pp. 139-144.

Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

Kostic, et al. "Fundamentals of Dynamic Frequency Hopping in Cellular Systems," IEEE Journal on Selected Areas in Communications, vol. 19, No. 11, November 2001, pp. 2254-2266.

Kousa, M. et al., "Adaptive Binary Coding for Diversity Communication Systems" IEEE International Conference on Personal Wireless Communications Proceedings, pp. 80-84, XP000992269, (1997).

Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.

Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.

Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.

Lott: "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Naofal Al-Dhahir: "A Bandwidth-Optimized Reduced-Complexity Equalized Multicarrier Transceiver", IEEE Transactions on Communications, vol. 45, No. 8, Aug. 1997, pp. 1-17.

Naofal Al-Dhahir: "Optimum Finite-Length Equalization for Multicarrier Transceivers", IEEE Trans. On Comm., pp. 56-64, Jan. 1996.

Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.

Natarajan, et al., "High-Performance MC-CDMA via Carrier Interferometry Codes," IEEE Transactions on Vehicular Technology, 2001, vol. 50 (issue 6) pp. 1344-1353.

S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.

Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM "93., IEEE, Nov. 29, 1993, pp. 1749-1753, vol. 3.

Sari, et al., "Transmission Techniques for Digital Terrestrial TV Broadcasting," IEEE Communications Magazine, Feb. 1995, pp. 100-109.

Shattil et al., "Array Control Systems for Multicarrier Protocols Using a Frequency-Shifted Feedback Cavity", Radio and Wireless Conference EEE, Aug. 1-4, 1999, pp. 215-218.

Siemens, Evolved UTRA uplink scheduling and frequency reuse[online], 3GPP TSG-WG1 # 41 R1-050476, Internet < URL:http://www.3gpp.org/ftp/tsg_ran/WG1_RL1/TSGR1_41/Docs/R1-050476.zip>, May 9, 2005.

Sorger U., et al., "Interleaved FDMA—A New Spread-Spectrum Multiple-Access Scheme, XP010284733," Communications, Conference Record, IEEE, Atlanta, GA, 1998, pp. 1013-1017.

Telecommunications Industry Association, Mobile Station-Base Station Compatibility Standard for Dual-Mode Wideband Spread Spectrum Cellular System, TIA/EIA-95, Jul. 1993, 668 pages.

Tellado, "Multicarrier Modulation with Low PAR," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

TIA-1121.001 "Physical Layer for Ultra Mobile Broadband (UMB) Air Interface Specification," 3GPP2 C.S0084-001-0, Version 2.0 (Aug. 2007).

TIA-1121.002 "Medium Access Control Layer for Ultra Mobile Broadband (UMB) Air Interface Specification," 3GPP2 C.S0084-002-0, Version 2.0 (Aug. 2007).

Tomcik J, "MBFDD and MBTDD Wideband Mode: Technology Overview", IEEE 802.20 Working Group Mobile Broadband Wireless Access, Jan. 6, 2006, pp. 1-109.

Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand col., paragraph 1.

Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.

Xiaodong, et al., "M-Sequences for OFDM Peak-to-Average Power Ratio Reduction and Error Correction," Electronics Letters, vol. 33, Issue 7, Mar. 27, 1997, pp. 554-555.

Yun et al., "Performance of an LDPC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.

Zekri, et al., "DMT Signals with Low Peak-to-Average Power Ratio," Proceedings, IEEE International Symposium on Computers and Communications, 1999, Jul. 6-8, 1999, pp. 362-368.

Bengtsson, M. et at, "A Generalization of Weighted Subspace Fitting to Full-Rank Models", IEEE Transactions on Signal Processing, IEEE Service Center, New York, NY, US, vol. 49, No. 5, May 1, 2001.

Chiani, et al., "Outage Evaluation for Slow Frequency-Hopping Mobile Radio Systems" IEEE Transactions on Communications, Vol. 47, No. 12 December 1999, pp. 1865-1874.

Dai, Y. et al., "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.

Dierks, et al., "The TLS Protocol", Version 1.0, Network Working Group, Request for Comments 2246, pp. 1-80 (Jan. 1999).

Ken Murakami et al., "Status Toward Standardization at IEEE 802.3ah and Challenge to System Architecture," Technical Report of the Institute of Electronics, Information and Communication Engineers, Jun. 13, 2003, vol. 103, No. 124, pp. 1-6, IN2003-24.

Schnell, et al., "Application of IFDMA to Mobile Radio Transmission", IEEE 1998 International Conference on Universal Personal Communications, vol. 2, Oct. 5-9, 1998, pp. 1267-1272.

Schnell, M. et al., "A Promising New Wideband Multiple-Access Scheme For Future Mobile Communications Systems", European Transactions on Telecommunications, Jul. 1, 1999, vol. 10, No. 4, pp. 417-427, Wiley & Sons, Chichester, GB, XP009069928, ISSN: 1 124-31 8X.

Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, Mar. 18, 2005.

* cited by examiner

○ Constellation used by $C_{2k-1}$

× Constellation used by $C_{2k}$

SIGNALING METHOD IN AN OFDM MULTIPLE ACCESS SYSTEM

CROSS-REFERENCE TO RELATED APPLICATIONS

The present application is a continuation of U.S. patent application Ser. No. 12/171,155, filed Jul. 10, 2008, which is a continuation of U.S. patent application Ser. No. 09/805,887, filed on Mar. 15, 2001, now issued as U.S. Pat. No. 7,295,509 on Nov. 13, 2007 which is hereby expressly incorporated by reference and which claims the benefit of U.S. Provisional Patent Application Ser. No. 60/230,937 filed Sep. 13, 2000, and titled "SIGNALING METHOD IN AN OFDM MULTIPLE ACCESS WIRELESS SYSTEM," which is also incorporated by reference.

TECHNICAL FIELD

This invention relates to an orthogonal frequency division multiplexing (OFDM) communication system, and more particularly to an OFDM communication system for a multiple access communication network.

BACKGROUND

Orthogonal frequency division multiplexing (OFDM) is a relatively well known multiplexing technique for communication systems. OFDM communication systems can be used to provide multiple access communication, where different users are allocated different orthogonal tones within a frequency bandwidth to transmit data at the same time. In an OFDM communication system, the entire bandwidth allocated to the system is divided into orthogonal tones. In particular, for a given symbol duration T available for user data transmission, and a given bandwidth W, the number of available orthogonal tones F is given by WT. The spacing between the orthogonal tones $\Delta$ is chosen to be 1/T, thereby making the tones orthogonal. In addition to the symbol duration T which is available for user data transmission, an additional period of time $T_c$ can be used for transmission of a cyclic prefix. The cyclic prefix is prepended to each symbol duration T and is used to compensate for the dispersion introduced by the channel response and by the pulse shaping filter used at the transmitter. Thus, although a total symbol duration of $T+T_c$ is employed for transmitting an OFDM symbol, only the symbol duration T is available for user data transmission and is therefore called an OFDM symbol duration.

In prior OFDM techniques, an OFDM signal is first constructed in the frequency domain by mapping symbols of a constellation to prescribed frequency tones. The signal constructed in the frequency domain is then transformed to the time domain by an inverse discrete Fourier transform (IDFT) or inverse fast Fourier transform (IFFT) to obtain the digital signal samples to be transmitted. In general, symbols of the constellation have a relatively low peak-to-average ratio property. For example, symbols of a QPSK constellation all have the same amplitude. However, after being transformed by the IDFT or IFFT, the resultant time domain signal samples are the weighted sum of all the symbols, and therefore generally do not preserve the desirable low peak-to-average ratio property. In particular, the resulting time domain signal typically has a high peak-to-average ratio.

Existing techniques for implementing OFDM communication systems can be highly inefficient due to the relatively high peak-to-average ratio when compared with other signaling schemes, such as single carrier modulation schemes. As a result, existing OFDM techniques are not well suited for a wireless multiple access communication network with highly mobile users because the high peak-to-average ratio of the transmitted signal requires a large amount of power at the base station and at the wireless device. The large power requirements result in short battery life and more expensive power amplifiers for handheld wireless communication devices or terminals. Accordingly, it is desirable to provide an OFDM technique which reduces the peak-to-average ratio of the signal to be transmitted, while simultaneously taking advantage of the larger communication bandwidth offered by an OFDM communication system.

SUMMARY

In one aspect of the communication system, power consumption associated with generating and transmitting OFDM signals is reduced as compared to the prior OFDM systems discussed above. The OFDM signaling method includes defining a constellation having a plurality of symbols, defining the symbol duration for the OFDM communication signal, and defining a plurality of time instants in the symbol duration. In a given symbol duration, a plurality of tones in the symbol duration are allocated to a particular transmitter and the signal to be transmitted is represented by a vector of data symbols from the symbol constellation. The symbols are first directly mapped to the prescribed time instants in the symbol duration. A continuous signal is then constructed by applying continuous interpolation functions to the mapped symbols such that the values of the continuous signal at the prescribed time instants are respectively equal to the mapped symbols and the frequency response of the continuous signal only contains sinusoids at the allocated tones. Finally the digital signal, which is to be transmitted, consists of samples of the continuous signal. Alternatively, the digital signal can be generated directly by applying discrete interpolation functions to the mapped symbols. As symbols from the constellation generally have good peak-to-average ratio property, proper choices of allocated frequency tones, prescribed time instants and interpolation functions can result in a minimized peak-to-average ratio of the continuous function and the digital signal samples.

In one implementation the method of directly generating the digital signal samples is to multiply the symbol vector consisting of symbols to be transmitted with a constant matrix, where the constant matrix is determined by the allocated frequency tones and the prescribed time instants. The matrix can be precomputed and stored in a memory.

In one aspect, a transmitter associated with the communication system is allocated a number of contiguous tones and the prescribed time instants are equally-spaced time instants over the entire OFDM symbol duration.

In another aspect, the transmitter is allocated a number of equally-spaced tones and the prescribed time instants are equally-spaced time instants over a fraction of the OFDM symbol duration.

In the above aspects, in addition to the general method, the digital signal samples can be constructed by expanding the mapped symbols to a prescribed set of time instants from minus infinity to plus infinity and interpolating the expanded set of the mapped symbols with a sinc function. Equivalently, the digital signal samples can also be generated by a series of operations including discrete Fourier transformation, zero insertion, and inverse discrete Fourier transformation.

To further reduce the peak-to-average ratio of the digital signal samples obtained through interpolation, when symbols of the constellation are mapped to the prescribed time instants, the constellations used by two adjacent time instants are offset by π/4.

In another aspect of the system, the real and the imaginary components of the resultant digital sample vector are cyclically offset before the cyclic prefix is added. In yet another aspect of the communication system, the intended transmitter is allocated more tones than the number of symbols to be transmitted. Symbols of the constellation are directly mapped to prescribed equally-spaced time instants. The digital signal samples are constructed by expanding the mapped symbols to a prescribed set of time instants from minus infinity to plus infinity and interpolating the expanded set of the mapped symbols with a function whose Fourier transformation satisfies the Nyquist zero intersymbol interference criterion, such as raised cosine functions. The digital signal samples can also be generated by a series of operations including discrete Fourier transformation, windowing, and inverse discrete Fourier transformation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
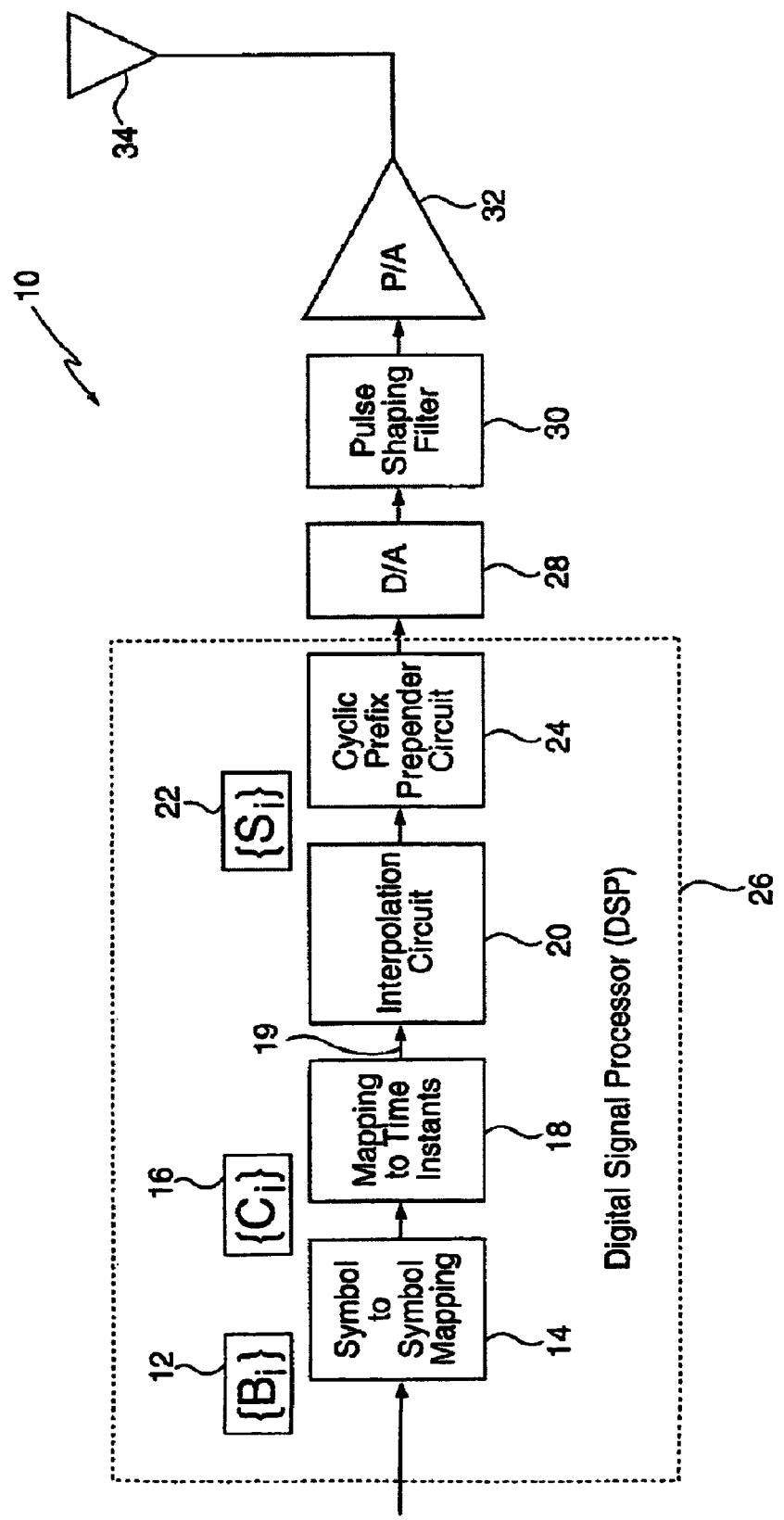
FIG. 1 is a block diagram of an OFDM system.

Referring to FIG. 1, an orthogonal frequency division multiplexing (OFDM) communication system 10 is shown. OFDM communication system 10 receives a first constellation of symbols $\{B_i\}$ 12 and provides the symbols to a symbol-to-symbol mapping circuit 14, that produces a second constellation of complex symbols $\{C_i\}$ 16. The complex symbols 16 represent data or a stream of data to be transmitted by the OFDM communication system, and may be chosen from a variety of symbol constellations including, but not limited to phase shift keying (PSK) and quadrature amplitude modulation (QAM) symbol constellations. The symbol-to-symbol mapping performed by the mapping circuit 14 is an optional step performed by the OFDM communication system 10.

Next, a time instant mapping circuit 18 maps each complex symbol 16 to a prescribed time instant within a given OFDM symbol duration. The mapping operation is performed in the time domain such that the mapping circuit 18 generates a discrete signal of mapped symbols within the time domain symbol duration. The output of the mapping circuit 18 is provided to an interpolation circuit 20, that produces a series of digital signal samples $\{S_i\}$ 22. The digital signal samples 22 are formed by sampling a continuous signal, which is constructed by applying one or more predetermined continuous interpolation functions to the mapped complex symbols 19. Alternatively, the digital signal samples 22 are formed by directly applying one or more predetermined discrete interpolation functions to the mapped complex symbols 19. When using the technique of applying discrete interpolation functions, no intermediate continuous signal is generated and the step of sampling the continuous signal is not necessary. The operation of the interpolation circuit 20 is described in greater detail below. A cyclic prefix circuit 24 receives the series of digital signal samples 22 from the interpolation circuit 20 and prepends a cyclic prefix to the digital signal samples 22. The cyclic prefix circuit 24 operates to copy and prepend the last portion of the digital signal sample vector S 22 to the beginning of the OFDM symbol duration. The resulting digital signal samples 22 with the prepended cyclic prefix are converted to an analog signal by a digital to analog converter 28. The resulting analog signal is further processed by a pulse shaping filter 30, the output of which is modulated to a carrier frequency, and amplified by a power amplifier unit 32 for transmission through an antenna 34.

In one implementation of the OFDM communication system 10, the symbol-to-symbol mapping circuit 14, the time instant mapping circuit 18, the interpolation circuit 20, and the cyclic prefix circuit 24 are implemented in a digital signal processor (DSP) 26, and may include a combination of hardware modules and/or software modules. These circuits 14, 18, 20, and 24 can also be implemented as separate discrete circuits within the OFDM communication system 10.

Figure 2A:
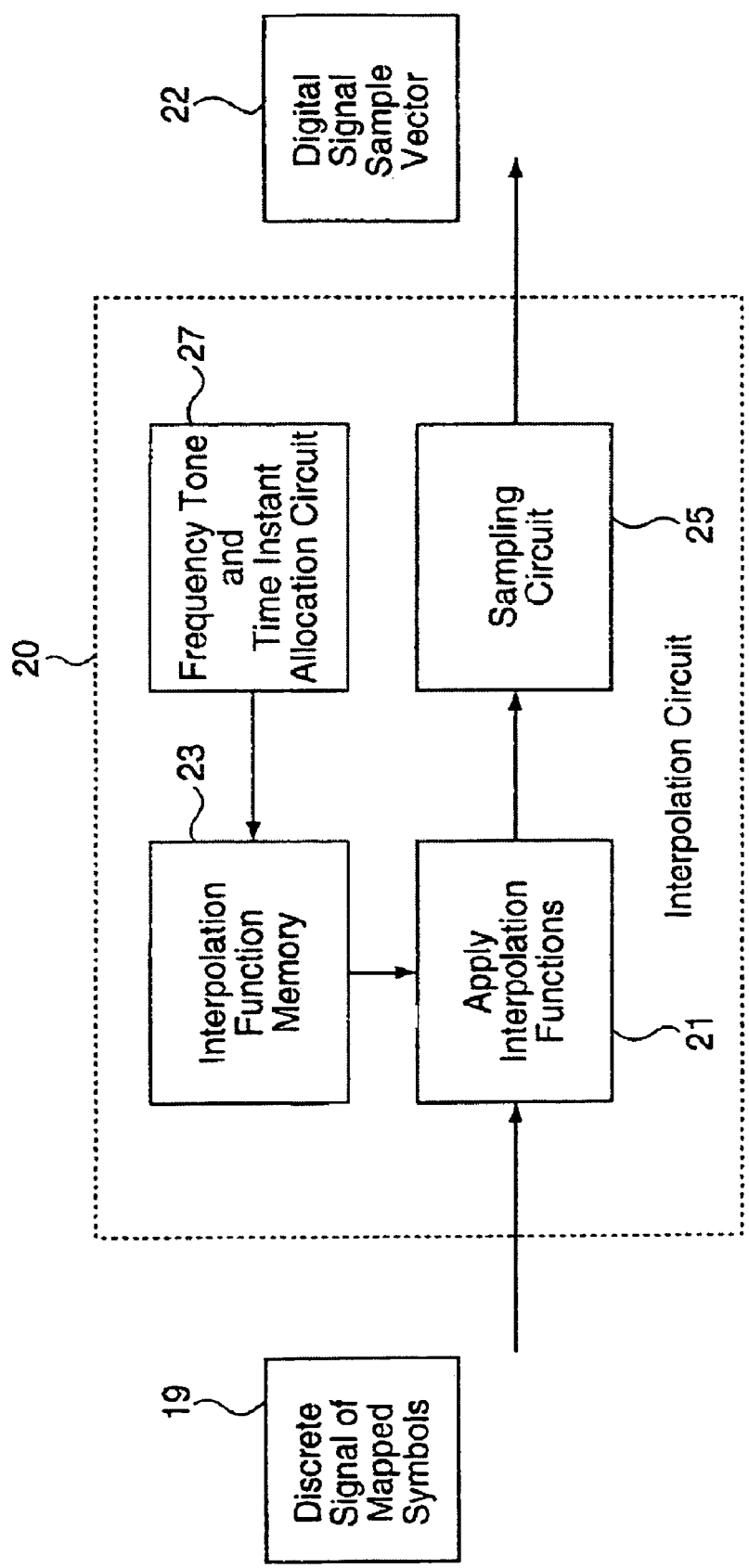
FIG. 2A is a block diagram of an interpolation system used by the OFDM system of FIG. 1.

The details of the interpolation circuit 20 are shown in FIG. 2A. The interpolation circuit 20 includes an interpolation function module 21 that applies one or more continuous interpolation functions to the discrete signal of mapped symbols 19 to generate a continuous signal in which signal variation between adjacent symbols is minimized. Thus, the continuous signal has a low peak-to-average ratio. The interpolation functions may be precomputed and stored in an interpolation function memory 23 connected to the interpolation function module 21. A frequency tone and time instant allocation circuit 27 is connected to the interpolation function memory 23 and defines an allocated tone set selected from frequency tones distributed over a predetermined bandwidth associated with the OFDM communication system 10. The allocated tone set is then provided to the interpolation function memory 23. The frequency tone and time instant allocation circuit 27 also defines the prescribed time instants distributed over the time domain symbol duration, which can also be stored in the interpolation function memory 23 for use by the interpolation function module 21 as well as other modules within the DSP 26. The interpolation circuit 20 also includes a sampling circuit 25 for receiving and sampling the continuous signal at discrete time instants distributed over the time domain symbol duration to generate the vector of digital signal samples 22. Alternatively, in FIG. 2B the interpolation function module 21 applies one or more discrete interpolation functions to the discrete signal of mapped symbols 19 to directly generate the digital signal sample vector 22, in which case the sampling circuit 25 (of FIG. 2A) is not needed. Through applying the discrete interpolation functions, the interpolation function module 21 effectively combines the processing steps of applying the continuous interpolation functions and sampling the intermediate continuous signal.

Figure 3A:
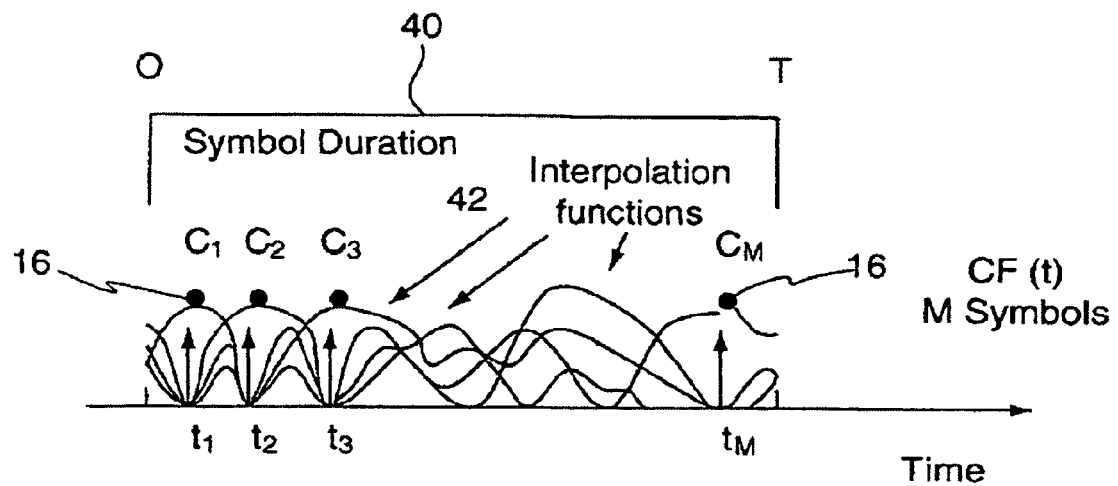
FIG. 3A is a graph showing symbols mapped to prescribed time instants in the time domain according to the OFDM technique implemented by the system of FIG. 1.

FIG. 3A graphically depicts the signal processing steps performed by the various circuits of the DSP 26. More specifically, FIG. 3A shows the construction of the signal to be transmitted in a given OFDM time domain symbol duration 40. The time domain symbol duration 40 is a time interval from 0 to T. For purposes of the following description, the OFDM symbol duration T does not include the cyclic prefix. The signal to be transmitted in the symbol duration 40 is represented by complex symbols $C_1, C_2, C_3, \ldots, C_M$ 16 that are mapped to the prescribed time instants, where M denotes the number of symbols to be transmitted in the symbol duration 40.

In one implementation, the OFDM communication system 10 is a multiple access communication system where the entire bandwidth available to all transmitters within the system is divided into F orthogonal frequency tones, $f_1, f_2, \ldots, f_F$. In the given symbol duration 40, a particular transmitter operating within a multiple access communication system is allocated M frequency tones $f_{i(1)}, f_{i(2)}, \ldots, f_{i(M)}$, which is a subset of $f_1, f_2, \ldots, f_F$, (the total number of frequency tones) in order to transmit the signal. As part of this implementation, the number of tones allocated to a particular transmitter is equal to the number of symbols to be transmitted by that transmitter. Later in FIG. 8A, the number of allocated tones can be greater than the number of symbols to be transmitted. The remaining frequency tones can be used by other transmitters within the communication system. This technique allows OFDM communication system 10 to operate as a multiple access communication system.

The complex data symbols $C_1, C_2, C_3, \ldots, C_M$ 16 are first mapped to $t_1, t_2, t_3, \ldots, t_M$, respectively, where $t_1, t_2, t_3, \ldots, t_M$ are M prescribed time instants within the time domain symbol duration 40. The mapping operation generates a discrete signal of mapped symbols. It should be noted that the number of prescribed time instants is equal to the number of symbols M to be transmitted. As described above, the symbol mapping occurs in the time domain. Continuous interpolation functions 42 are then applied to the discrete signal of mapped symbols 16 to generate a continuous function CF(t) for t in the time interval from 0 to T.

The interpolation functions 42 are constructed such that the values of the continuous function CF(t) at time instants $t_1, t_2, t_3, \ldots, t_M$ are respectively equal to $C_1, C_2, C_3, \ldots, C_M$ and the frequency response of the continuous function CF(t) contains only sinusoids at the allocated tones. Therefore, CF(t) is constructed as $$CF(t) = \sum_{k=1}^{M} A_k e^{j2\pi f_{i(k)} t}$$

where $J=\sqrt{-1}$ and coefficients $A_k$ are given by $$\begin{bmatrix} A_1 \\ \vdots \\ A_M \end{bmatrix} = \begin{bmatrix} e^{j2\pi f_{i(1)} t_1} & \ldots & e^{j2\pi f_{i(M)} t_1} \\ \vdots & & \vdots \\ e^{j2\pi f_{i(1)} t_M} & \ldots & e^{j2\pi f_{i(M)} t_M} \end{bmatrix}^{-1} \begin{bmatrix} C_1 \\ \vdots \\ C_M \end{bmatrix}$$

Thus, each coefficient $A_k$ is generated by multiplying a matrix of predetermined sinusoids with the single column of data symbols $C_1, C_2, C_3, \ldots, C_M$ 16.

Figure 3B:
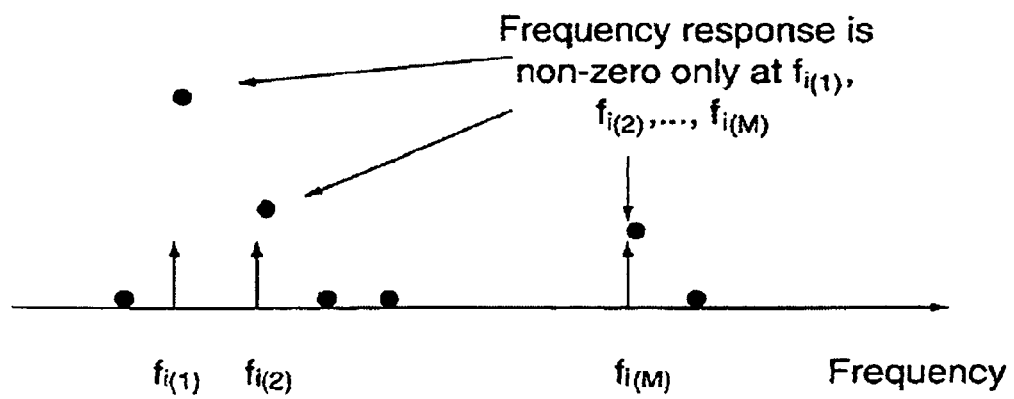
FIG. 3B is a graph showing the frequency domain response of the graph of FIG. 3B.

FIG. 3B shows the frequency response of the continuous function CF(t). More specifically, FIG. 3B shows that the frequency response of the continuous function is non-zero only at the allocated frequency tones $f_{i(1)}, f_{i(2)}, \ldots, f_{i(M)}$, and is zero at all other frequency tones.

The output of the DSP 26 is a vector of digital signal samples S 22, which are the samples of the continuous function CF(t) at discrete time instants 0, T/N, 2T/N, ..., T(N−1)/N, that is, $S_1$=CF(0), $S_2$=CF(T/N), $S_3$=CF(2T/N), $S_N$=CF(T(N−1)/N), where N is the number of discrete time instants in the vector of digital signal samples 22. In a general form, $t_1, \ldots, t_M$ may not necessarily be equal to any of the time instants 0, T/N, 2T/N T(N−1)/N. Therefore, while the digital signal samples S 22 may occur at the time instants $t_1, \ldots, t_M$, the OFDM communication system 10 does not require that the time instants 0, T/N, 2T/N T(N−1)/N be equal to $t_1 \ldots, t_M$.

Figure 2B:
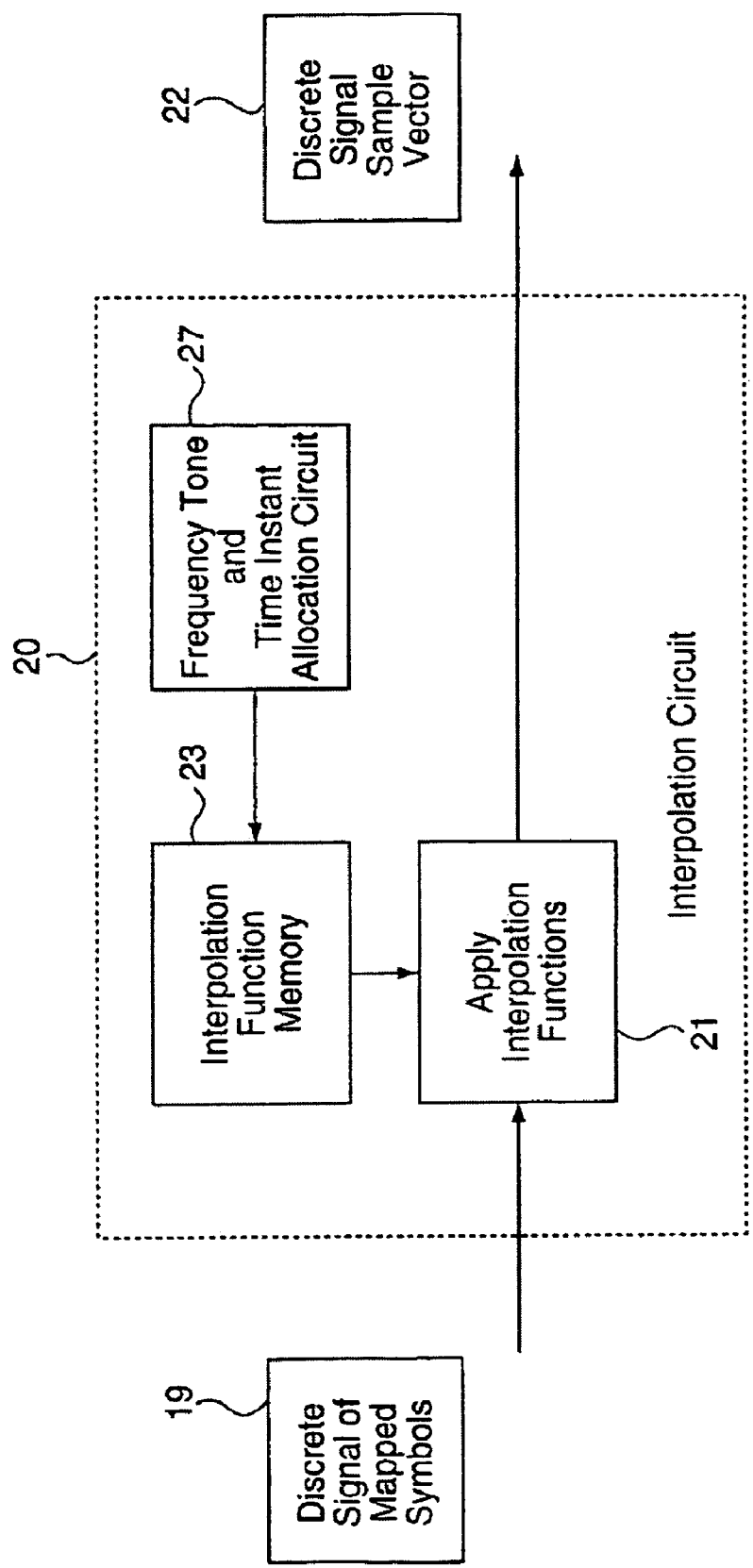
FIG. 2B is a block diagram of another interpolation system used by the OFDM system of FIG. 1.

In another implementation of OFDM communication system 10, the digital signal samples S 22 may be generated by the DSP 26 by directly multiplying a matrix of precomputed sinusoidal waveforms Z, operating as discrete interpolation functions, with the discrete signal of mapped symbols C in order to satisfy the transformation function S=ZC according to the following:

$$S = \begin{bmatrix} S_1 \\ \vdots \\ S_N \end{bmatrix} = \begin{bmatrix} e^{J2\pi f_{i(1)}0} & \cdots & e^{J2\pi f_{i(M)}0} \\ \vdots & & \vdots \\ e^{J2\pi f_{i(1)}T\frac{N-1}{N}} & \cdots & e^{J2\pi f_{i(M)}T\frac{N-1}{N}} \end{bmatrix} \begin{bmatrix} A_1 \\ \vdots \\ A_M \end{bmatrix}$$

$$= \begin{bmatrix} e^{J2\pi f_{i(1)}0} & \cdots & e^{J2\pi f_{i(M)}0} \\ \vdots & & \vdots \\ e^{J2\pi f_{i(1)}T\frac{N-1}{N}} & \cdots & e^{J2\pi f_{i(M)}T\frac{N-1}{N}} \end{bmatrix}$$

$$\begin{bmatrix} e^{J2\pi f_{i(1)}t_1} & \cdots & e^{J2\pi f_{i(M)}t_1} \\ \vdots & & \vdots \\ e^{J2\pi f_{i(1)}t_M} & \cdots & e^{J2\pi f_{i(M)}t_M} \end{bmatrix}^{-1} \begin{bmatrix} C_1 \\ \vdots \\ C_M \end{bmatrix}$$

$$= ZC$$

where C represents the symbol vector, and the matrix Z represents the product of the two matrices in the second line of the above equation. Each column (i) of matrix Z represents the interpolation function 42 of a corresponding symbol $C_i$ to generate the digital signal samples S 22. As such, the matrix Z can be pre-computed and stored in the interpolation function memory 23 of the interpolation circuit 20 (FIG. 2B). The interpolation circuit 20 then applies the discrete interpolation functions 42 defined by the matrix Z to the discrete signal of mapped complex symbols C 16 in order to satisfy the criteria of S=ZC and to generate the vector of digital signal samples 22.

The purpose of constructing the signal in the time domain is to directly map the symbols 16, which have a desirable low peak-to-average ratio property, to the prescribed time instants within the symbol duration 40. Appropriate interpolation functions 42 are selected to obtain the continuous function CF(t) and the digital signal samples 22 such that the desirable low peak-to-average ratio property of the symbols 16 is substantially preserved for the continuous function and for the digital signal samples 22. The peak-to-average ratio property of the resulting (interpolated) continuous function CF(t) and the digital signal samples 22 is dependent upon the interpolation functions 42, the choice of allocated frequency tones $f_{i(1)}, f_{i(2)}, f_{i(M)}$ from the set of tones, and the prescribed time instants $t_1, \ldots t_M$.

Figure 4A:
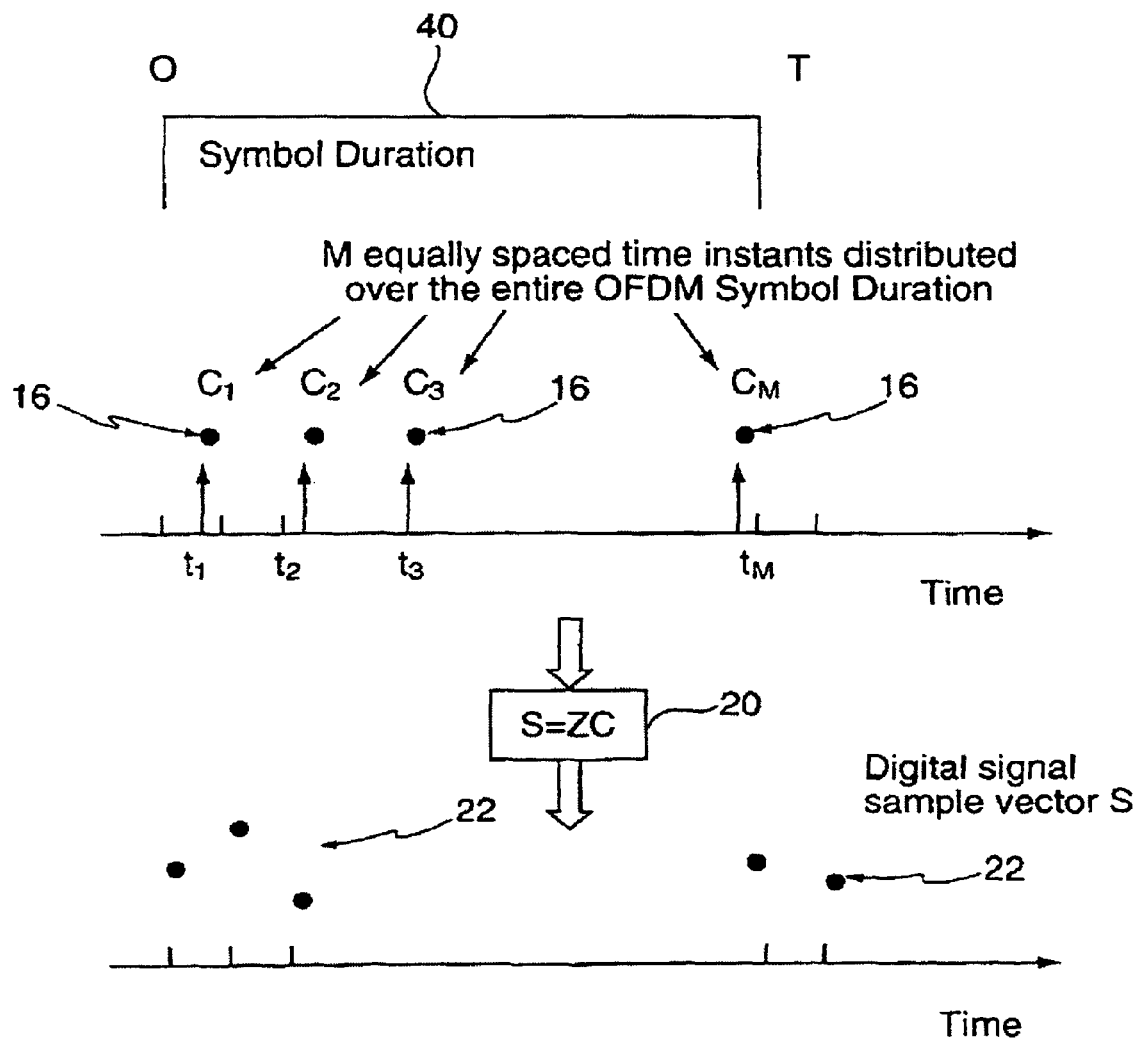
FIG. 4A shows an implementation technique for producing a digital signal sample vector using time domain symbol mapping in the case where the allocated tones are contiguous.

Referring to FIG. 4A, one implementation of the OFDM communication system 10 allocates tones $f_{i(1)}, f_{i(2)}, \ldots, f_{i(M)}$ to the transmitter associated with the communication system that are a subset of contiguous tones in the tone set $f_1, f_2, \ldots, f_F$. Therefore, $f_{i(k)}=f_0+(k-1)\Delta$, for k=1, ..., M, where M is the number of symbols. If the OFDM communication system 10 is a multiple access system, each transmitter associated with the communication system is allocated a non-overlapping subset of frequency tones. For purposes of description, let $f_0=0$. The construction for the other cases where $f_0 \neq 0$ can be similarly obtained.

Complex symbols $C_1, \ldots, C_M$ 16 are mapped in the time domain to the following time instants $t_k=(k-1)T/M$, for k=1, ..., M. As part of this implementation, the prescribed time instants $t_1, \ldots, t_M$ are equally-spaced time instants uniformly distributed over the entire OFDM symbol duration 40 as shown in the first time domain graph of FIG. 4A. Given the choice of the allocated frequency tones and prescribed time instants, the matrix Z, which is used to generate the digital signal samples S as discussed in FIGS. 3A-3B, can be simplified to $$Z = \frac{1}{M} \begin{bmatrix} e^{J2\pi f_{i(1)}0} & \cdots & e^{J2\pi f_{i(M)}0} \\ \vdots & & \vdots \\ e^{J2\pi f_{i(1)}T\frac{N-1}{N}} & \cdots & e^{J2\pi f_{i(M)}T\frac{N-1}{N}} \end{bmatrix} \begin{bmatrix} e^{-J2\pi f_{i(1)}t_1} & \cdots & e^{-J2\pi f_{i(1)}t_M} \\ \vdots & & \vdots \\ e^{-J2\pi f_{i(M)}t_1} & \cdots & e^{-J2\pi f_{i(M)}t_M} \end{bmatrix}.$$

The second time domain graph of FIG. 4A shows the resulting digital signal sample vector S 22 after the interpolation circuit 20 applies the interpolation functions 42 defined by the matrix Z to the complex symbols 16 according to the expression S=ZC. As part of this implementation, the sampling module 25 is not generally used as the digital signal sample vector S 22 is directly generated from the discrete signal of mapped symbols using the transformation function S=ZC.

Figure 4B:
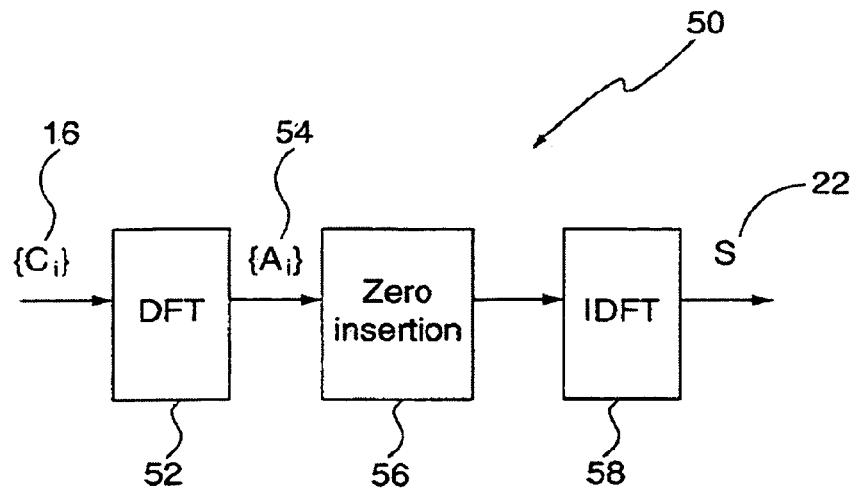
FIG. 4B is a block diagram showing a communication system for producing a digital signal sample vector in the case where the allocated frequency tones are contiguous.

Turning to FIG. 4B, a digital processing system 50 provides another technique for obtaining the vector of digital signal samples S. A DFT circuit 52 receives a discrete signal of complex data symbols $C_i$ and calculates the frequency responses $A_1, \ldots, A_M$, at tones $f_{i(1)}, f_{i(2)}, \ldots, f_{i(M)}$, through an M-point discrete Fourier transform (DFT). The vector $[A_1, \ldots, A_M]$ 54 output by the DFT circuit 52 is then expanded to a new vector of length N (the total number of time instants in the discrete signal vector S) by zero insertion at block 56. More specifically, this process involves putting the $k^{th}$ symbol $A_k$ to the $i(k)^{th}$ element of the new vector, for k=1, ..., M, where $f_{i(k)}$ is the $k^{th}$ tone allocated to the transmitter, and inserting zeros in all the remaining elements. Finally, an IDFT circuit 58 performs an N-point inverse discrete Fourier transform on the resulting vector (after zero insertion) to obtain the digital signal sample vector S. The collective procedure of DFT, zero insertion and IDFT is one way of implementing the discrete interpolation functions.

Figure 4C:
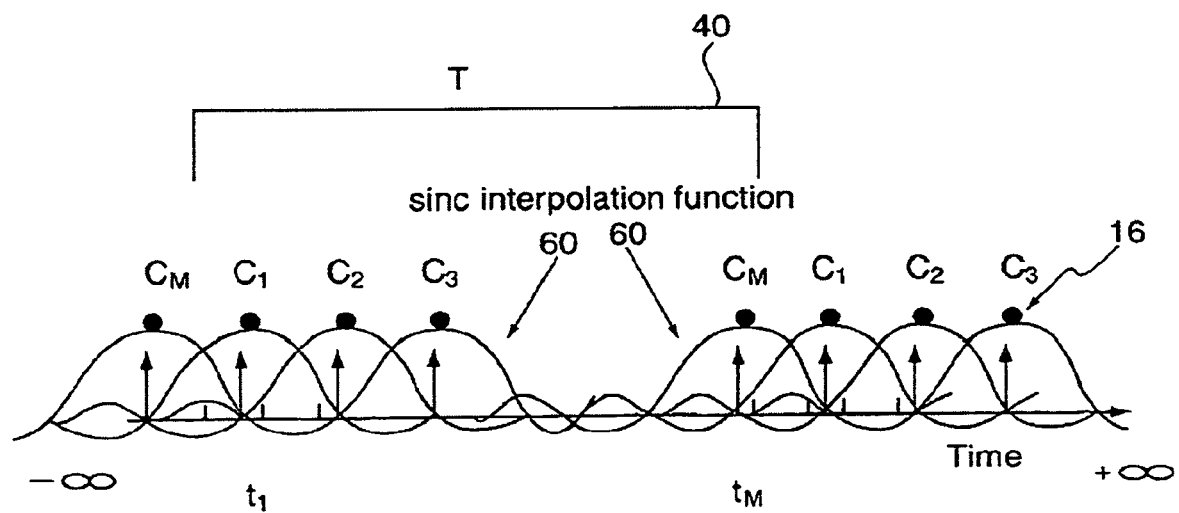
FIG. 4C is a graph showing the mapping of the symbols to the prescribed time instants, the expansion of the mapped symbols, and the use of a sinc function to interpolate the expanded symbols.

Turning to FIG. 4C, another technique for obtaining the digital signal samples S is shown. For simplicity of description, it is assumed that the allocated contiguous tones $f_{i(1)}, f_{i(2)}, \ldots, f_{i(M)}$ are centered at frequency 0. The construction for the other cases where the allocated tones are not centered at frequency 0 can be similarly obtained. As with FIG. 4A, the prescribed time instants $t_1, \ldots, t_M$ are equally-spaced time instants uniformly distributed over the entire OFDM symbol duration 40.

The complex symbols $C_1, \ldots, C_M$ are first mapped in the time domain to time instants $t_1, \ldots, t_M$ respectively. Next, the mapped symbols $C_1, \ldots, C_M$ are leftwards and rightwards shifted and replicated to an expanded set of prescribed time instants, which is a superset of $t_1, t_M$ and consists of an infinite number of equally-spaced time instants covering the time interval from $-\infty$ to $+\infty$. This technique creates an infinite series of mapped symbols C. The continuous function CF(t) is then constructed by interpolating the infinite series of mapped symbols using a sinc interpolation function 60. Mathematically, the above steps construct the continuous function CF(t) as $$1.\ CF(t) = \sum_{i=1}^{M} \left\{ C_i \sum_{k=-\infty}^{\infty} \mathrm{sinc}\left(t - t_i - kT, \frac{T}{M}\right) \right\}.$$

where sinc(a,b)=sin($\pi$a/b)/($\pi$a/b). The sinc interpolation function 60 can also be precomputed and stored in the interpolation function memory 23. As discussed in FIG. 3A the digital signal samples S 22 are the samples of the continuous function CF(t) at time instants 0, T/N, ..., T(N−1)/N. In FIGS. 4A-4C, if N is a multiple of M, then $S_{1+(k-1)N/M}=C_k$, for k=1, ..., M. It should be noted that the continuous function CF(t) only applies to the symbol duration 40 from 0 to T. The use of time interval from −∞ to +∞ is solely for the purpose of mathematically constructing CF(t). The discrete interpolation functions, which combine the continuous interpolation functions and the sampling function, can be derived easily from the above description.

Figure 4D:
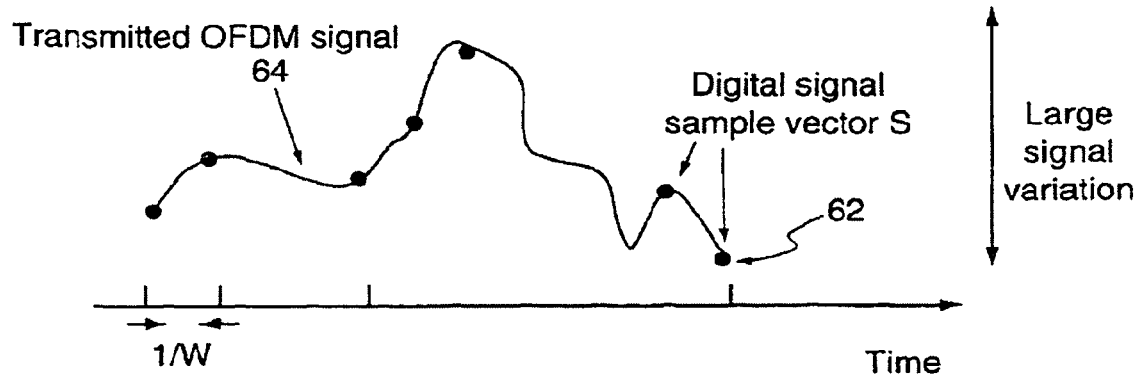
FIG. 4D is a graph showing the large peak-to-average ratio of the resulting digital signal sample vector when the symbols are mapped in the frequency domain in the prior OFDM systems.

For comparison purposes, FIG. 4D illustrates the resulting peak-to-average ratio for a digital signal sample vector S 62 and its associated transmitted OFDM signal 64 produced by symbols 16 where the signal is constructed in the frequency domain. As described above, this known technique of mapping the symbols 16 in the frequency domain produces a large signal variation in the transmitted OFDM signal 64 and results in a large peak-to-average ratio.

Figure 4E:
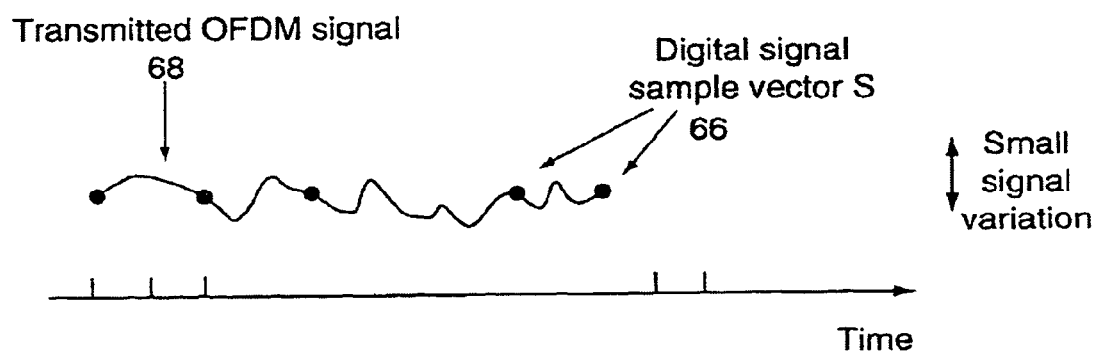
FIG. 4E is a graph showing the reduced peak-to-average ratio of the resulting digital signal sample vector when the symbols are mapped in the time domain using the technique of FIGS. 4A-4C.

FIG. 4E illustrates the resulting small signal variation and low peak-to-average ratio of the digital signal sample vector S 66 associated with the transmitted OFDM signal 68. As will be appreciated by comparing FIGS. 4D and 4E, mapping the constellation of complex symbols 16 in the time domain produces an OFDM signal 68 having a significantly reduced peak-to-average ratio.

Figure 5A:
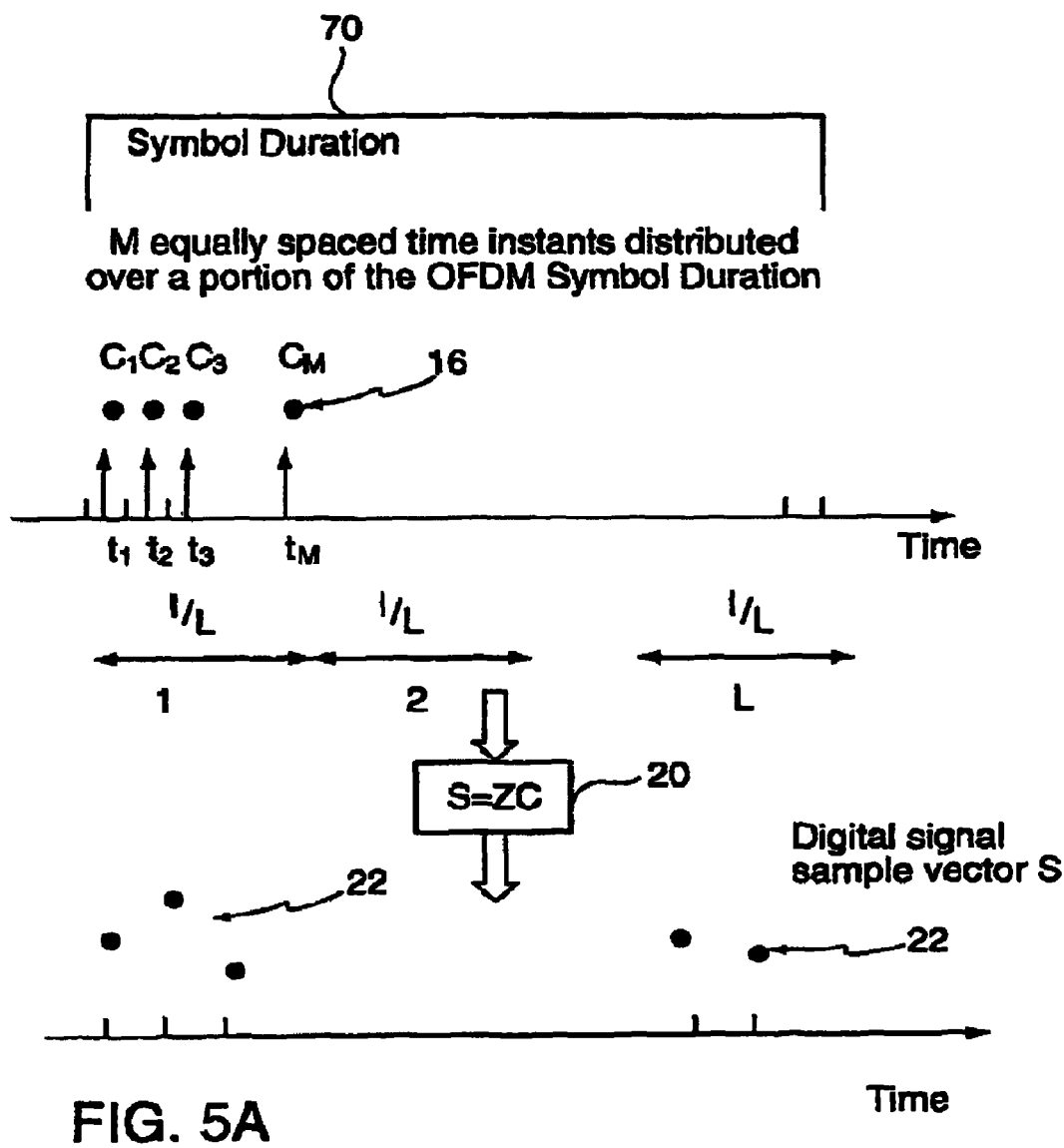
FIG. 5A shows another implementation technique for producing the digital signal sample vector using time domain symbol mapping in the case where the allocated tones are equally spaced in frequency.

FIG. 5A shows a second implementation of the OFDM communication system 10, and serves to further generalize the system shown in FIGS. 4A-4C. As part of OFDM system 10, tones, $f_{i(1)}, f_{i(2)}, \ldots, f_{i(M)}$, allocated to the transmitter associated with the communication system, are a subset of equally-spaced tones in the tone set $f_1, f_2, \ldots, f_F$. Therefore, $f_{i(k)}=f_0+(k-1)L\Delta$, for k=1, ..., M, and L is a positive integer number representing the spacing between two adjacent allocated frequency tones. When L=1, this implementation is equivalent to the implementation technique described in FIGS. 4A-4C. For the sake of description, let $f_0=0$. The construction for the other cases where $f_0 \neq 0$ can be similarly obtained.

In this case where the allocated tones are equally-spaced tones, the constructed continuous function CF(t) is identical in each of the L time intervals, [0,T/L), [T/L,2T/L), ..., and [(L−1)T/L, T/L). As part of this technique, symbols $C_1, \ldots, C_M$ 16 are mapped to the following time instants $t_k=(k-1)T/M/L$, for k=1, ..., M. In this implementation, the prescribed time instants $t_1, \ldots, t_M$ are equally-spaced time instants uniformly distributed over a fraction (1/L) of the symbol duration 70. As a comparison, in the case of allocated contiguous tones (FIG. 4A), the prescribed time instants are equally-spaced and distributed over the entire symbol duration, as discussed with respect to FIG. 4A.

The procedure for obtaining the digital signal samples S 22 described in FIG. 4A can also be applied with respect to FIG. 5A. More specifically, the digital signal sample vector S is the product of matrix Z (defining the discrete interpolation functions) and the symbol vector C. Given the choice of the allocated frequency tones and prescribed time instants, the matrix Z, which is used to generate the digital signal samples 22 from the discrete signal of mapped symbols, can be simplified to the same formula as in FIG. 4A with the only change in the definition of $f_{i(1)}, f_{i(2)}, \ldots, f_{i(M)}$ and $t_1, \ldots, t_M$.

Figure 5B:
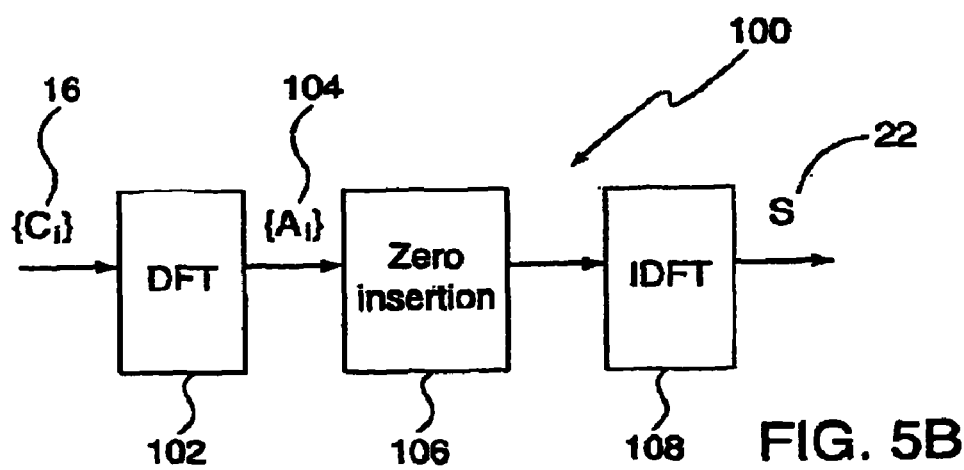
FIG. 5B is a block diagram showing a communication system for producing a digital signal sample vector in the case where the allocated frequency tones are equally spaced.

In FIG. 5B, the procedure of obtaining the digital signal sample vector S 22 described in FIG. 4B can also be applied to the case of allocated frequency tones that are equally spaced tones. More specifically, a digital processing system 100 provides another technique for obtaining the vector of digital signal samples S. A DFT circuit 102 receives a discrete signal of complex data symbols $C_i$ and calculates the frequency responses $A_1, \ldots, A_M$, at tones $f_{i(1)}, f_{i(2)}, \ldots, f_{i(M)}$, through an M-point discrete Fourier transform (DFT). The vector $[A_1, \ldots, A_M]$ 104 output by the DFT circuit 102 is then expanded to a new vector of length N (the total number of time instants in the digital signal sample vector S) by zero insertion at block 106. More specifically, this process involves putting the $k^{th}$ symbol $A_k$ to the i(k)th element of the new vector, for k=1, ..., M, where $f_{i(k)}$ is the $k^{th}$ tone allocated to the transmitter, and inserting zeros in all the remaining elements. Finally, an IDFT circuit 108 performs an N-point inverse discrete Fourier transform on the resulting vector (after zero insertion) to obtain the time domain digital signal sample vector S. The collective procedure of DFT, zero insertion and IDFT is one way of implementing the discrete interpolation functions.

Figure 5C:
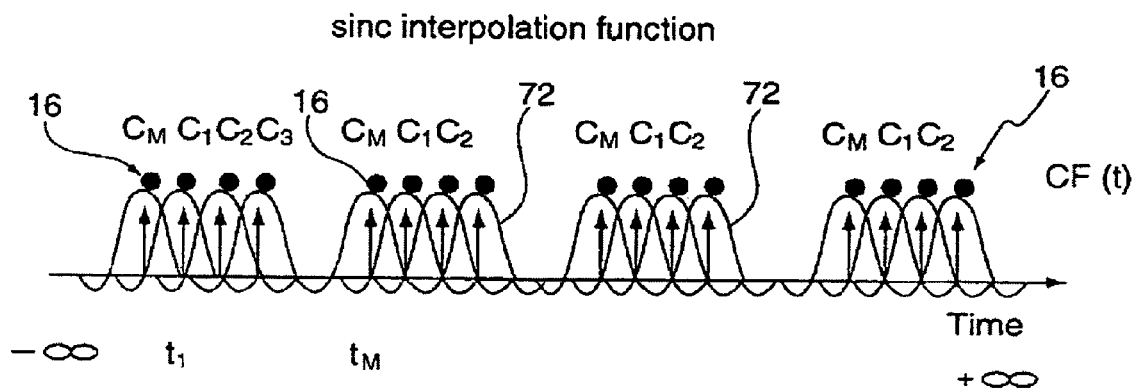
FIG. 5C is a graph showing the mapping of the symbols to the prescribed time instants, the expansion of the mapped symbols, and the use of a sinc function to interpolate the symbols.

FIG. 5C is the counterpart of FIG. 4C, where symbols $C_1, \ldots, C_M$ are first mapped to $t_1, \ldots, t_M$ respectively over a fraction (1/L) of the symbol duration 70. The symbol mapping is also performed in the time domain. Next the mapped symbols $C_1, \ldots, C_M$ are leftwards and rightwards shifted and replicated to an expanded set of prescribed time instants from −∞ to +∞ which creates an infinite series of symbols. The continuous function CF(t) is then constructed by interpolating the infinite series of mapped symbols with a sinc interpolation function 72. Thus, the continuous function CF(t) includes the digital signal samples mapped to the prescribed time instants as well as digital sample points between the prescribed time instants. Mathematically, the above steps construct the continuous function as $$CF(t) = \sum_{i=1}^{M} \left\{ C_i \sum_{k=-\infty}^{\infty} \operatorname{sinc}\left(t - t_i - kT\frac{1}{L}, \frac{T}{M}\frac{1}{L}\right) \right\}.$$

With continued reference to FIG. 5C, each sinc interpolation function 72 is narrower and therefore decays faster than the sinc interpolation function 60 shown in FIG. 4C. The sinc interpolation function 72 can also be precomputed and stored in the interpolation function memory 23 for use by the interpolation function module 21. The digital sample vector S 22 can be obtained in the same technique shown in FIG. 4C. In FIGS. 5A and 5C, if N is a multiple of ML, then $S_{1+(k-1)N/M/L+(j-1)N/L}=C_k$, for k=1, ..., M, and j=1, ..., L. The discrete interpolation functions, which combine the continuous interpolation functions and the sampling function, can be derived easily from the above description.

Figure 5D:
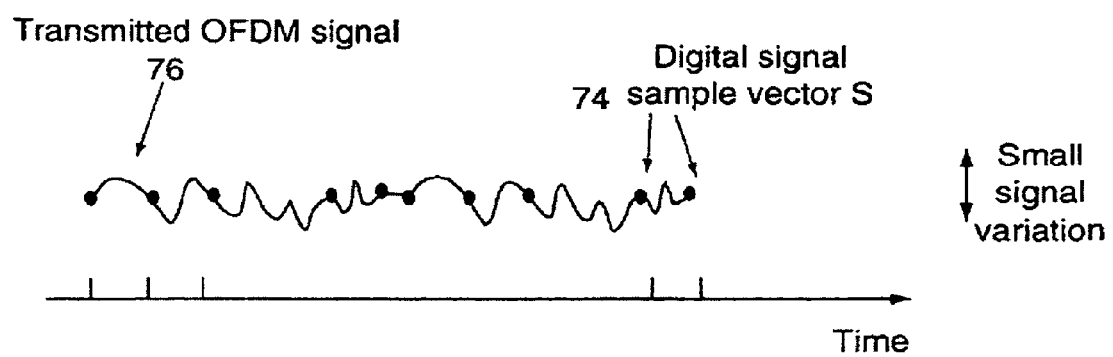
FIG. 5D is a graph showing the reduced peak-to-average ratio of the resulting digital signal sample vector when the symbols are mapped in the time domain using the technique of FIGS. 5A-5C.

FIG. 5D illustrates the resulting small signal variation and low peak-to-average ratio of the digital signal sample vector S 74 associated with the transmitted OFDM signal 76. As will be appreciated by comparing FIGS. 4D and 5D, mapping the constellation of complex symbols 16 in the time domain produces an OFDM signal 76 having a significantly lower peak-to-average ratio.

Figure 6:
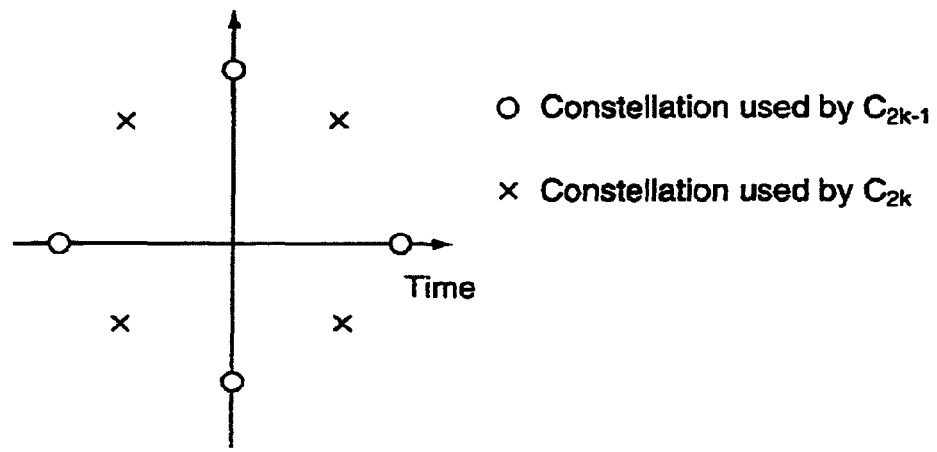
FIG. 6 is a graph showing π/4 symbol rotation.

Referring now to FIG. 6, a π/4 symbol rotation technique is used to further reduce the peak-to-average ratio of the transmitted OFDM signal. At an OFDM symbol duration, if symbols $B_1, \ldots, B_M$ of the constellation are to be transmitted, symbols $B_1, \ldots, B_M$ are mapped to another block of complex symbols $C_1, \ldots, C_M$, where each odd number symbol remains unchanged and each even number symbol is phase rotated by π/4. For example, if symbols $B_1, \ldots, B_M$ belong to a QPSK constellation {0, π/2, π, π3/2}, the odd number symbols $C_k$ still belong to the same QPSK constellation, while after being phase rotated the even number symbols $C_k$ belong to another QPSK constellation {π/4, π3/4, π5/4, π7/4}. Symbols $C_1, \ldots, C_M$ are then used to construct the digital signal samples 22 in the time domain as described above with respect to FIGS. 3A-5C.

Figure 7:
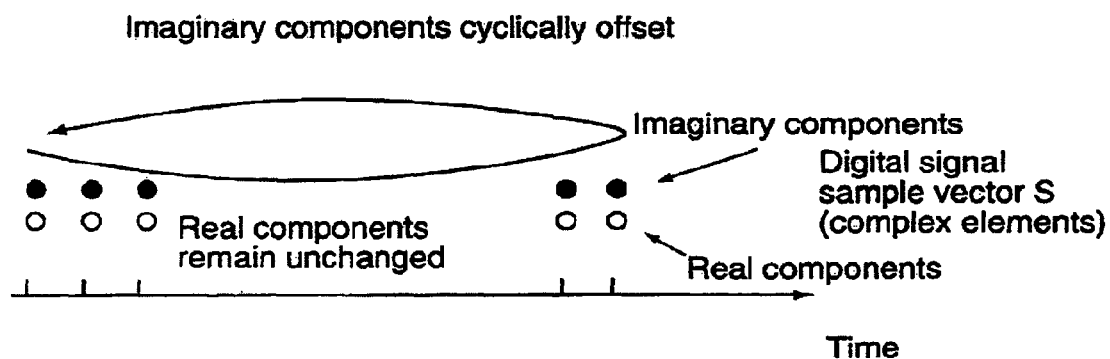
FIG. 7 shows the use of a cyclic shift of the real and imaginary signal components.
Figure 7:
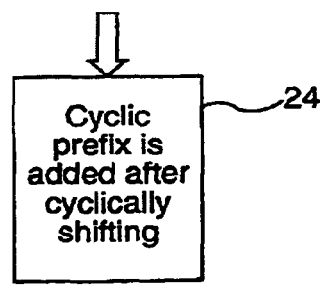

With reference to FIG. 7, another technique for reducing the peak-to-average ratio is shown, which introduces a cyclic offset of the real and imaginary signal components. This technique involves a first step of offsetting the imaginary components of the digital signal samples S 22, which have been generated using the technique of FIGS. 3A-5C, by an integer number of samples. If necessary, the technique then involves a second step of adjusting the timing by a fraction of a sample period between the real and the imaginary signal components in the transmit path.

At an OFDM symbol duration, if the digital signal samples $S_1, S_2, \ldots, S_N$ have been obtained using the method as described in FIGS. 3A-5C, the digital signal sample vector S is then mapped to another vector S' as follows. The real component of digital signal sample $S'_k$ is equal to that of digital signal sample $S_k$. The imaginary component of digital signal sample $S'_k$ is equal to that of digital signal sample $S_j$ where index j=(k+d-1)mod N+1, for k=1, ..., N, with mod representing a module operation. The parameter d is an integer representing the cyclic offset, in terms of number of samples, between the real and imaginary components.

In one implementation, the value of d is determined by N/2LM, where L is discussed in FIG. 5A. In one aspect of this technique, d is chosen to be close to N/2LM. For example, d can be the integer closest to N/1LM, the largest integer not greater than N/2LM, or the smallest integer not smaller than N/2LM. In one example, d is chosen to be the largest integer not greater than N/2LM. This example can be easily extended for other choices of d.

The digital signal sample vector S' is then passed to the cyclic prefix prepender circuit 24, as shown in FIG. 1. Therefore, the operation of half symbol cyclic shifting is carried out before the operation of prepending the cyclic prefix, such as that performed by the cyclic prefix circuit 24 of FIG. 1.

Not specifically shown in FIG. 7, when or after the sample vector S' and the cyclic prefix are outputted to the digital to analog converter 28, the imaginary components are further delayed by an amount of $$\left(\frac{N}{2LM} - d\right)\frac{T}{N},$$

which is a fraction of a sample period T/N.

As a variation of the technique shown in FIG. 7 (not specifically shown), another technique for achieving a similar result can be used to eliminate the second step of adjusting timing by a fraction of a sample period between the real and the imaginary signal components in the transmit path. As part of this technique, the real and the imaginary components of the desired digital signal samples S 22 are generated separately as described by the following.

A first series of digital signal samples 22 are generated using the technique of FIGS. 3A-5C. The real components of the desired digital signal samples 22 are equal to those of the first series of samples. A second series of digital signal samples 22 are generated using the technique of FIGS. 3A-5C except for the following changes. The imaginary components of the desired digital signal samples are equal to those of the second series of samples. In the general method described in FIGS. 3, 4A, and 5A, the matrix $$\begin{bmatrix} e^{j2\pi f_{i(1)}0} & \cdots & e^{j2\pi f_{i(M)}0} \\ \vdots & & \vdots \\ e^{j2\pi f_{i(1)}T\frac{N-1}{N}} & \cdots & e^{j2\pi f_{i(M)}T\frac{N-1}{N}} \end{bmatrix}$$

is changed to $$\begin{bmatrix} e^{j2\pi f_{i(1)}(0-\frac{T}{2LM})} & \cdots & e^{j2\pi f_{i(M)}(0-\frac{T}{2LM})} \\ \vdots & & \vdots \\ e^{j2\pi f_{i(1)}(T\frac{N-1}{N}-\frac{T}{2LM})} & \cdots & e^{j2\pi f_{i(M)}(T\frac{N-1}{N}-\frac{T}{2LM})} \end{bmatrix}.$$

In the block diagram method described with regard to FIG. 4B, an additional operation is required after zero insertion (block 56) and before N-point IDFT (block 58), where each element k in the expanded length N vector is phase rotated by $$e^{-j2\pi f_k \frac{T}{2LM}}.$$

Referring to FIGS. 8A-8D, another technique for further reducing the peak-to-average ratio is implemented by allocating more frequency tones than the number of complex symbols to be transmitted in a symbol duration 40. In FIGS. 3-7, the number of tones allocated to the transmitter associated with the communication system is equal to the number of symbols to be transmitted in a given OFDM symbol duration. Compared with the other techniques described with respect to the previous figures, the technique of FIGS. 8A-8D requires additional overhead of bandwidth to transmit the same number of complex symbols.

For example, if the communication system 10 is allocated $M+M_{ex}$ contiguous frequency tones, $f_{i(1)}, f_{i(2)}, \ldots, f_{i(M+Mex)}$, and M symbols $C_1, \ldots, C_M$ of the constellation are to be transmitted at an OFDM symbol duration, from the comparison of FIGS. 4A and 5A, the case of allocated contiguous tones can be easily extended to the case of allocated equally-spaced tones. As part of this implementation of the OFDM communication system 10, $M_{ex}$ is a positive number representing the number of excess tones to be used and is assumed to be an even number. Therefore, the allocated tone $$f_{i(k)} = f_0 + \left(k - \frac{M_{ex}}{2} - 1\right)\Delta,$$

for k=1, ..., $M+M_{ex}$. For purposes of description, let $f_0=0$. The construction for the other cases where $f_0 \neq 0$ can be similarly obtained.

As with the technique described with respect to FIG. 4A, the prescribed time instants are $t_k=(k-1)T/M$, for k=1, ..., M, that is, the prescribed time instants $t_1, t_M$ are equally-spaced time instants in the symbol duration 40.

Figure 8A:
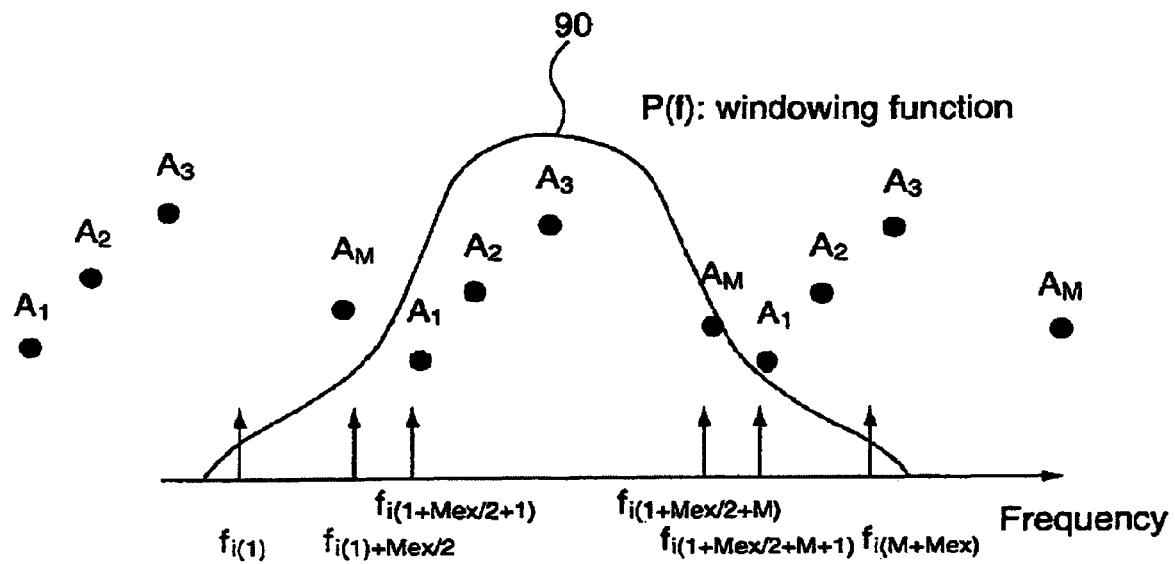
FIG. 8A is a graph showing application of a windowing function in the frequency domain to further reduce the peak-to-average ratio.

As part of this technique shown in FIG. 8A, P(f) is a smooth windowing function 90 in the frequency domain, which is non-zero only over interval $[f_{i(1)}, f_{9(M+Mex)}]$. In addition, P(f) 90 also satisfies the Nyquist zero intersymbol interference criterion, i.e., $$\sum_{k=-\infty}^{\infty} P(f - kM\Delta) = 1$$

for any frequency f, where is the spacing between adjacent tones.

Figure 8B:
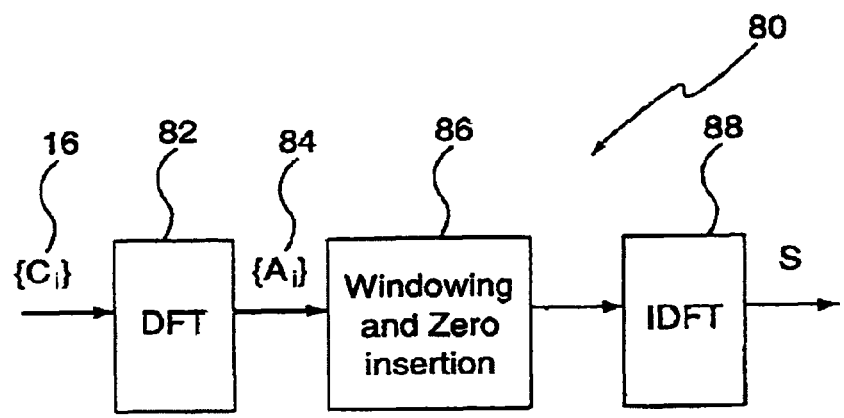
FIG. 8B is a block diagram showing a technique using more tones than the number of symbols to be transmitted for producing a digital signal sample vector.

FIG. 8B shows the block diagram of the technique. As described above, a symbol-to-symbol mapping is optionally performed to generate a discrete signal of mapped complex symbols $C_1, \ldots, C_M$, 16. The frequency responses $A_1, \ldots, A_M$ 84 are calculated through an M-point discrete Fourier transform (DFT) of the complex symbols 16 at block 82. At block 86, vector $[A_1, \ldots, A_M]$ 84 is cyclically expanded to a new vector A' of length N and windowed with a windowing function 90 as follows:

3.

$$A'_k = A_{g(k)} * P((k-1)+f_1) \qquad 4.$$

5.

where index $g(k) = \mod(k - i(1) - M_{ex}/2, M) + 1$, for $k = 1, \ldots, N$.

At block 88, the digital signal sample vector S is obtained by taking an N-point inverse discrete Fourier transform (IDFT) of the new vector A'. Finally, the cyclic prefix is added by cyclic prefix circuit 24 as described above with regard to FIG. 1.

Figure 8C:
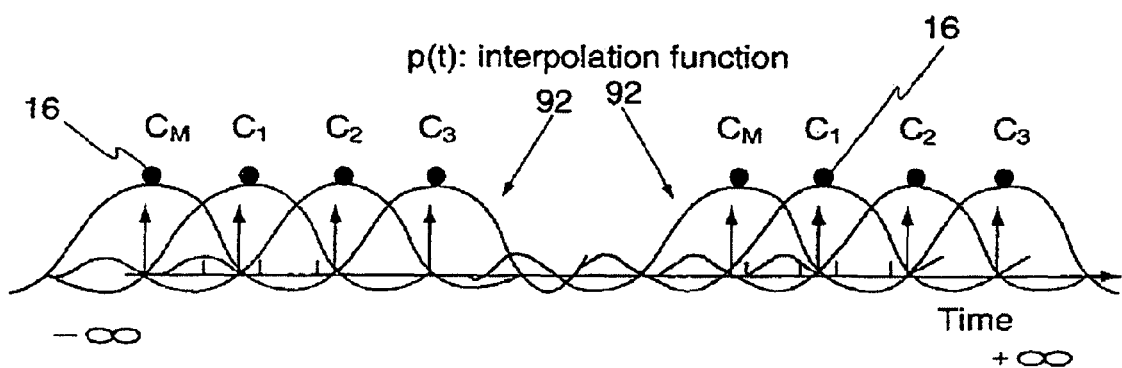
FIG. 8C is a graph showing the use of an interpolation function corresponding to the window function of FIG. 8B to the symbols mapped to the prescribed time instants.

To provide additional insight to the above signal construction technique, assume that the allocated tones $f_{i(1)}, f_{i(2)}, \ldots, f_{i(M+Mex)}$ are centered at frequency 0. In FIG. 8C (as with FIG. 4C), symbols $C_1, \ldots, C_M$ are first mapped to equally-spaced time instants in the symbol duration 40, and are then leftwards and rightwards shifted and replicated from $-\infty$ to $+\infty$. What is different from FIG. 4C is that a different interpolation function 92, which is determined by the windowing function 90, is used to generate the continuous function, $$CF(t) = \Sigma_{i=1}^{M} C_i \Sigma_{k=-\infty}^{\infty} p(t - t_i - kT) \qquad 6.$$

7.

where p(t) 92 is the time domain response of P(f) 90. As with FIG. 4C, the digital signal samples are obtained by letting $t = 0, T/N, \ldots, T(N-1)/N$.

In one exemplary aspect of this technique, if a raised cosine windowing function is used, i.e., $$8. \quad P(f) = \begin{cases} \dfrac{T}{M} & \text{if } |f| < (1-\beta)\dfrac{M}{2T} \\ \dfrac{T}{2M}\left\{1 + \cos\left[\dfrac{\pi T}{\beta M}\left(|f| - \dfrac{(1-\beta)M}{2T}\right)\right]\right\} & \text{if } (1-\beta)\dfrac{M}{2T} \le |f| \le (1+\beta)\dfrac{M}{2T} \\ 0 & \text{if } |f| > (1+\beta)\dfrac{M}{2T} \end{cases}$$

where $\beta = (M_{ex}+2)/M$ represents the percentage of excess tone overhead, then, the interpolation function p(t) 92 is given by $$p(t) = \frac{\sin(\pi t M/T)}{\pi t M/T} \cdot \frac{\cos(\pi \beta t M/T)}{1 - 4\beta^2 t^2 M^2/T^2}.$$

As $\beta$ increases, the interpolation function p(t) 92 decays faster, thereby reducing the probability of having large peak at samples between $t_i$.

Figure 8D:
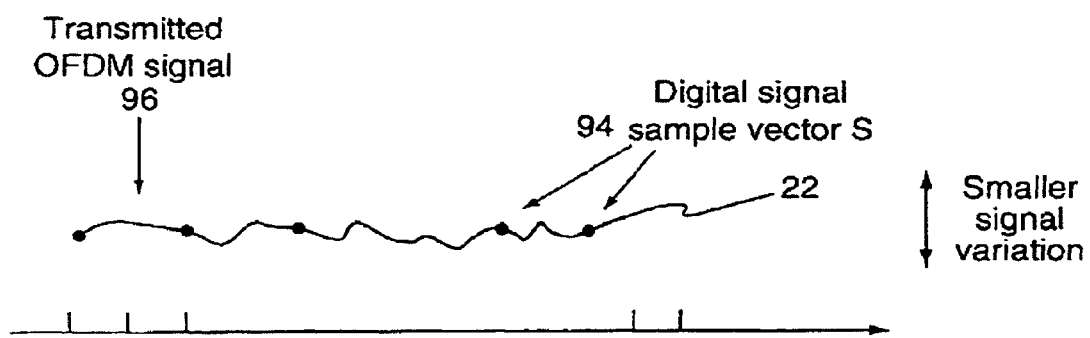
FIG. 8D is a graph showing the reduced peak-to-average ratio of the resulting digital signal sample vector when the symbols are mapped in the time domain using the technique of FIGS. 8A-8C.

FIG. 8D shows the resulting small signal variation and low peak-to-average ratio of the digital signal sample vector S 94 associated with the transmitted OFDM signal 96. As will be appreciated, mapping the constellation symbols 16 in the time domain produces an OFDM signal 96 having a significantly lower peak-to-average signal ratio.

A number of embodiments of the invention have been described. Nevertheless, it will be understood that various modifications may be made without departing from the spirit and scope of the invention. Accordingly, other embodiments are within the scope of the following claims.

What is claimed:

1. A processor-based apparatus for generating wireless communications, the processor-based apparatus comprising:
   a first circuit configured to perform a Discrete Fourier Transform (DFT) on a discrete signal of complex data symbols to obtain a first frequency response vector of length M;
   a second circuit configured to perform an N-point Inverse DFT (IDFT) on a second frequency response vector of length N, generated from the first frequency response vector by inserting zero value symbols corresponding to tones not allocated to the apparatus, to obtain a vector of digital signal samples; and
   a third circuit configured to generate a low peak-to-average orthogonal frequency division multiplexing (OFDM) signal representing the vector of digital signal samples for transmission.

2. The processor-based apparatus of claim 1, wherein N is greater than M.

3. The processor-based apparatus of claim 1, wherein the second frequency response vector has entries corresponding to tones other than tones allocated to the processor-based apparatus.

4. The processor-based apparatus of claim 3, wherein the first circuit performs a DFT with a set of tones allocated to the processor-based apparatus for transmission.

5. The processor-based apparatus of claim 4, wherein the allocated tones are contiguous.

6. The processor-based apparatus of claim 4, wherein the allocated tones are equally spaced.

7. The processor-based apparatus of claim 1, wherein the first, second, and third circuits comprise a combination of hardware and software modules.

8. The processor-based apparatus of claim 1, wherein at least one of the first, second, and third circuits comprises a software module.

9. The processor-based apparatus of claim 1, wherein the third circuit comprises:
   a circuit configured to convert the vector of digital signal samples to an analog signal.

10. The processor-based apparatus of claim 9, wherein the third circuit further comprises:
    a circuit configured to modulate the analog signal to a carrier frequency for transmission.

11. The processor-based apparatus of claim 10, wherein the third circuit further comprises:
    a pulse filter circuit configured to process the analog signal prior to modulation to the carrier frequency.

12. The processor-based apparatus of claim 10, further comprising:
    at least one antenna; and
    a power amplifier circuit configured to amplify the analog signal prior to transmission via the at least one antenna.

13. A method for wireless communications utilizing at least one processor, comprising:
performing a Discrete Fourier Transform (DFT) on a discrete signal of complex data symbols to obtain a first frequency response vector of length M;
performing an N-point Inverse DFT (IDFT) on a second frequency response vector, generated from the first frequency response vector of length N, generated from the first frequency response vector by inserting zero value symbols corresponding to tones not allocated to an apparatus, to obtain a vector of digital signal samples; and
generating a low peak-to-average orthogonal frequency division multiplexing (OFDM) signal representing the vector of digital signal samples for transmission.

14. The method of claim 13, wherein N is greater than M.

15. The method of claim 13, wherein the second frequency response vector has entries corresponding to tones other than tones allocated to an apparatus.

16. The method of claim 15, wherein the DFT is performed with a set of tones allocated to the apparatus for transmission.

17. The method of claim 16, wherein the allocated tones are contiguous.

18. The method of claim 16, wherein the allocated tones are equally spaced.

19. The method of claim 13, wherein the performing a DFT, performing an N-point IDFT, and generating a low peak-to-average OFDM signal are performed by a combination of hardware and software modules.

20. The method of claim 13, wherein at least one of the performing a DFT, performing an N-point IDFT, and generating a low peak-to-average OFDM signal is performed by a software module.

21. The method of claim 13, wherein generating low peak-to-average OFDM comprises:
converting the vector of digital signal samples to an analog signal.

22. The method of claim 21, wherein low peak-to-average OFDM further comprises:
modulating the analog signal to a carrier frequency for transmission.

23. The method of claim 22, wherein low peak-to-average OFDM further comprises:
performing pulse filtering of the analog signal prior to modulation to the carrier frequency.

24. The method of claim 22, further comprising:
amplifying the analog signal prior to transmission via at least one antenna.

25. A processor-based apparatus for generating wireless communications, comprising:
means for performing a Discrete Fourier Transform (DFT) on a discrete signal of complex data symbols to obtain a first frequency response vector of length M;
means for performing an N-point Inverse DFT (IDFT) on a second frequency response vector of length N, generated from the first frequency response vector by inserting zero value symbols corresponding to tones not allocated to an apparatus, to obtain a vector of digital signal samples; and
means for generating a low peak-to-average orthogonal frequency division multiplexing (OFDM) signal representing the vector of digital signal samples for transmission.

26. The processor-based apparatus of claim 25, wherein N is greater than M.

27. The processor-based apparatus of claim 25, wherein the second frequency response vector has entries corresponding to tones other than tones allocated to the processor-based apparatus.

28. The processor-based apparatus of claim 25, wherein the means for performing a DFT performs a DFT with a set of tones allocated to the processor-based apparatus for transmission.

29. The processor-based apparatus of claim 28, wherein the allocated tones are contiguous.

30. The processor-based apparatus of claim 28, wherein the allocated tones are equally spaced.

31. The processor-based apparatus of claim 25, wherein the means for performing a DFT, means for performing an N-point IDFT, and means for generating a low peak-to-average OFDM signal comprise a combination of hardware and software modules.

32. The processor-based apparatus of claim 25, wherein at least one of the means for performing a DFT, means for performing an N-point IDFT, and means for generating a low peak-to-average OFDM signal comprises a software module.

33. The processor-based apparatus of claim 25, wherein the means for generating a low peak-to-average OFDM signal comprises:
means for converting the vector of digital signal samples to an analog signal.

34. The processor-based apparatus of claim 33, wherein the means for generating a low peak-to-average OFDM signal further comprises:
means for modulating the analog signal to a carrier frequency for transmission.

35. The processor-based apparatus of claim 34, wherein the means for generating a low peak-to-average OFDM signal further comprises:
means for performing pulse filtering of the analog signal prior to modulation to the carrier frequency.

36. The processor-based apparatus of claim 34, further comprising:
at least one antenna; and
means for amplifying the analog signal prior to transmission via the at least one antenna.

* * * * *